United States Patent
Yagyu et al.

(10) Patent No.: US 9,944,183 B2
(45) Date of Patent: Apr. 17, 2018

(54) HUD INTEGRATED CLUSTER SYSTEM FOR VEHICLE CAMERA

(71) Applicant: DENSO KOREA ELECTRONICS CORPORATION, Changwon-si, Gyeongsangnam-do (KR)

(72) Inventors: Hiroshi Yagyu, Changwon-si (KR); Won Joong Kang, Changwon-si (KR); Oh Su Kwon, Changwon-si (KR); Dong Hun Kwak, Changwon-Si (KR)

(73) Assignee: Denso Korea Electronics Corporation (KR)

( * ) Notice: Subject to any disclaimer, the term of this patent is extended or adjusted under 35 U.S.C. 154(b) by 16 days.

(21) Appl. No.: 15/361,623

(22) Filed: Nov. 28, 2016

(65) Prior Publication Data
US 2018/0065482 A1   Mar. 8, 2018

(30) Foreign Application Priority Data
Sep. 6, 2016   (KR) .......................... 10-2016-0114276

(51) Int. Cl.
*B60K 35/00*   (2006.01)
*B60R 1/00*   (2006.01)
(Continued)

(52) U.S. Cl.
CPC ............. *B60K 35/00* (2013.01); *B60Q 9/008* (2013.01); *B60R 1/00* (2013.01); *G02B 27/0101* (2013.01);
(Continued)

(58) Field of Classification Search
CPC ............ B60K 35/00; B60K 2350/1088; B60K 2350/2013; B60K 2350/307; B60Q 9/008;
(Continued)

(56) References Cited

U.S. PATENT DOCUMENTS

| 7,568,823 B2 | 8/2009 | Bauer et al. |
| 9,168,869 B1 | 10/2015 | Kamal |

(Continued)

FOREIGN PATENT DOCUMENTS

| EP | 0830267 B2 | 11/2005 |
| EP | 2857942 A1 | 4/2015 |

(Continued)

*Primary Examiner* — Tom Sheng
(74) *Attorney, Agent, or Firm* — Park & Associates IP Law, P.C.

(57) ABSTRACT

Disclosed herein is an HUD integrated cluster system for a vehicle camera. The HUD integrated cluster system displays captured images of the rear view of the vehicle on a cluster and an HUD in front of the driver's seat. Thereby, the gaze shift distance and time may be reduced in watching the environment behind the vehicle and a traffic accident resulting from distraction from the front view may be prevented. The HUD integrated cluster system also displays, on the cluster and the HUD in front of the driver's seat, an image of at least one of the views of the rear center, rear left side and rear right side of the vehicle according to the speed of the vehicle, gear shift, blinking of a turn signal, and a steering direction of the steering wheel. Thereby, the driver may easily observe the rear view according to respective situations. In addition, the HUD integrated cluster system displays a captured image of a rear view of the vehicle and a warning light according to an object which is positioned near or is approaching the vehicle. Thereby, the driver's attention may be readily drawn when the vehicle moves backward or changes lanes.

13 Claims, 26 Drawing Sheets

(51) Int. Cl.
*G08G 1/16* (2006.01)
*B60Q 9/00* (2006.01)
*G02B 27/01* (2006.01)

(52) U.S. Cl.
CPC ........ *G08G 1/16* (2013.01); *B60K 2350/1088* (2013.01); *B60K 2350/2013* (2013.01); *B60K 2350/307* (2013.01); *B60R 2300/101* (2013.01); *B60R 2300/205* (2013.01); *B60R 2300/602* (2013.01); *B60R 2300/8026* (2013.01); *G02B 2027/014* (2013.01); *G02B 2027/0118* (2013.01); *G02B 2027/0138* (2013.01)

(58) Field of Classification Search
CPC ... B60R 1/00; B60R 11/04; B60R 2001/1284; B60R 2001/1253; B60R 2300/101; B60R 2300/105; B60R 2300/205; B60R 2300/301; B60R 2300/302; B60R 2300/303; B60R 2300/308; B60R 2300/602; B60R 2300/802; B60R 2300/8026; B60R 2300/804; B60R 2300/806; B60R 2300/8066; G02B 27/01; G02B 27/0101; G02B 2027/0118; G02B 2027/0138; G02B 2027/014; G08G 1/16
See application file for complete search history.

(56) References Cited

U.S. PATENT DOCUMENTS

| | | | | |
|---|---|---|---|---|
| 9,654,740 B2* | 5/2017 | Galarraga | ............... | H04N 7/183 |
| 2009/0225434 A1* | 9/2009 | Nicholas | ............... | B60R 1/00 |
| | | | | 359/630 |
| 2010/0253494 A1* | 10/2010 | Inoue | ............... | G01C 21/36 |
| | | | | 340/436 |
| 2011/0001825 A1* | 1/2011 | Hahn | ............... | B60R 1/00 |
| | | | | 348/148 |
| 2012/0154591 A1* | 6/2012 | Baur | ............... | B60R 1/00 |
| | | | | 348/148 |
| 2013/0138392 A1* | 5/2013 | Kumon | ............... | B60W 40/08 |
| | | | | 702/152 |
| 2014/0267585 A1* | 9/2014 | Chen | ............... | H04N 5/23238 |
| | | | | 348/36 |
| 2014/0375810 A1* | 12/2014 | Rodriguez | ............... | B60Q 1/50 |
| | | | | 348/148 |
| 2015/0316765 A1* | 11/2015 | Kim | ............... | H04N 5/247 |
| | | | | 345/7 |
| 2016/0137126 A1* | 5/2016 | Fursich | ............... | B60R 1/00 |
| | | | | 348/38 |
| 2016/0209647 A1* | 7/2016 | Fursich | ............... | G02B 27/0093 |
| 2016/0280136 A1* | 9/2016 | Besson | ............... | B60R 1/00 |
| 2017/0072855 A1* | 3/2017 | Kanagaraj | ............... | B60R 1/00 |
| 2017/0217368 A1* | 8/2017 | Lewis | ............... | B60R 1/00 |
| 2017/0249923 A1* | 8/2017 | Segawa | ............... | B60K 35/00 |
| 2017/0274827 A1* | 9/2017 | Lewis | ............... | B60R 1/08 |
| 2017/0299861 A1* | 10/2017 | Wierich | ............... | G02B 27/0101 |
| 2018/0001820 A1* | 1/2018 | Higgins | ............... | B60R 1/00 |

FOREIGN PATENT DOCUMENTS

| | | |
|---|---|---|
| EP | 2993072 A1 | 9/2015 |
| JP | 2006-248374 A | 9/2006 |
| JP | 2009-29203 A | 2/2009 |
| KR | 20-0475291 B1 | 11/2014 |
| KR | 10-1500190 B1 | 3/2015 |
| KR | 10-1565006 B1 | 11/2015 |
| KR | 10-2016-0091293 A | 8/2016 |

* cited by examiner

HUD INTEGRATED CLUSTER SYSTEM FOR VEHICLE CAMERA

REFERENCE TO RELATED APPLICATIONS

This application is based upon and claims the priority benefit of Korean Patent Application No. 10-2016-0114276 filed on Sep. 6, 2016, the entire contents of which are incorporated herein by reference.

FIELD OF THE INVENTION

The present invention relates to a head-up display (HUD) integrated cluster system for a vehicle camera which displays, on a cluster and an HUD, various kinds of information about the driving conditions of a vehicle and images captured by a camera installed outside the vehicle.

BACKGROUND OF THE INVENTION

A vehicle is a means of transportation that moves a user occupying the vehicle in a desired direction. A typical example of the vehicle is an automobile. While the vehicle provides movement convenience to the user, it requires the user to pay attention not only to the front environment but also to the rear environment during driving. Herein, the front and rear environments represent objects which are positioned around or approach the vehicle, namely hindrances to driving such as humans, vehicles and obstacles.

The user driving the vehicle, namely the driver shifts his/her gaze from a cluster 3 to a side mirror 4 to a rearview mirror 5 while watching the windshield 8 at the front of the vehicle 1, as shown in FIG. 1. Recently, a navigation system 6 having functions of audio output, video output, route guidance and display of images from a rear camera has been additionally installed in the center fascia, which is installed at the center of the dashboard 2, in order to further enhance driver convenience. Thereby, the driver shifts his/her gaze to see not only the cluster 3, the side mirror 4 and the rearview mirror 5 but also the navigation system 6.

Frequent shift of the driver's gaze may be inconvenient and fatiguing, and even cause a traffic accident resulting from distraction from the front view. Such issues need to be addressed.

Meanwhile, as shown in FIGS. 2 and 3, a vehicle 1 provided with a head-up display (HUD) 9 configured to project images related to the driving conditions of the vehicle and route guidance onto the windshield 8 in front of the driver's seat and the cluster 3 installed in the dashboard 20 in front of the driver's seat has been developed and released to reduce the gaze shift distance and gaze shift time of the driver. The cluster 3 and the HUD 9 are electrically connected to an ECU, which receives information from various sensors installed in the vehicle, to display graphic images related to the driving conditions of the vehicle and route guidance.

However, the HUD 9 merely displays images related to the driving conditions of the vehicle and route guidance, and thus the driver needs to shift his/her gaze from the windshield to the side mirrors and to the rearview mirror to watch the environment behind the vehicle.

SUMMARY OF THE INVENTION

Therefore, the present invention has been made in view of the above problems, and it is an object of the present invention to provide an HUD integrated cluster system for a vehicle camera which displays captured images of the rear view of the vehicle on a cluster and an HUD in front of the driver's seat in order to reduce the gaze shift distance and gaze shift time in watching the environment behind the vehicle and to prevent a traffic accident resulting from distraction from the front view.

It is another object of the present invention to provide an HUD integrated cluster system for a vehicle camera which displays, on the cluster and the HUD in front of the driver's seat, an image of at least one of the views of the rear center, rear left side and rear right side of the vehicle according to the speed of the vehicle, gear shift, blinking of a turn signal, and a steering direction of the steering wheel such that the driver can easily observe the rear view according to respective situations.

It is another object of the present invention to provide an HUD integrated cluster system for a vehicle camera which displays a captured image of a rear view of the vehicle and a warning light according to an object which is positioned near or approaching the vehicle, and thus may readily draw the driver's attention when the vehicle reverses or changes lanes.

It is a further object of the present invention to provide an HUD integrated cluster system for a vehicle camera which displays, on a part in front of the driver's seat, rear view images corresponding to the driver's seat and the front passenger seat and a captured image of an object which is positioned in front of the front passenger seat and is not easily visible from the driver's seat due to a front object, thereby facilitating lane change to a right lane.

Other objects, advantages and new features will be apparent from the following detailed description and the preferred embodiments in association with the accompanying drawings.

In accordance with the present invention, the above and other objects can be accomplished by the provision of a head-up display (HUD) integrated cluster system for a vehicle camera, including a rear capture unit including a rear camera and a horizontal rotation motor, the rear camera being horizontally rotatably coupled to a back of a vehicle to capture an image of a rear center, rear left side or rear right side of the vehicle, and the horizontal rotation motor being installed on the back of the vehicle to horizontally rotate the rear camera and having a horizontal output shaft coupled with the rear camera, a plurality of rear sensing units installed on the back of the vehicle to sense objects positioned at the rear center and rear left and right sides of the vehicle or approaching the vehicle, a cluster installed in a dashboard installed in front of a steering wheel of the vehicle and electrically connected to an electronic control unit (ECU) for receiving information from various sensors installed in the vehicle to display current driving conditions of the vehicle, the cluster including a cluster display unit configured to display route information related to a location and route of the vehicle or at least one of images of the rear center, rear left side and rear right side of the vehicle captured by the rear capture unit while displaying a warning light according to sensed values of the rear sensing units in a blinking manner, and an HUD electrically connected to the cluster and the ECU to display the current driving conditions of the vehicle and enable the image and warning light displayed on the cluster display unit of the cluster to be projected onto a windshield in front of a driver's seat of the vehicle, the HUD being installed in the dashboard in front of the driver's seat.

The rear sensing unit may include at least one of an ultrasonic sensor and a radar sensor.

The cluster may include a driving condition display unit configured to receive driving condition data of the vehicle from the ECU and display the current driving conditions of the vehicle including a speed of the vehicle and a fuel amount in an analog or digital manner, a global positioning system (GPS) configured to receive a GPS signal and calculate the route information related to the location and route of the vehicle, a cluster microcomputer configured to receive the sensed values of the rear sensing units and control the captured image from the rear capture unit and the warning light to be displayed together on the cluster display unit, the cluster microcomputer controlling the rear capture unit to selectively capture an image of the rear center, rear left side or rear right side of the vehicle by receiving, from the ECU, the speed of the vehicle, a gearshift position, blinking of a turn signal and a steering direction of the steering wheel and controlling the route information to be displayed on the cluster display unit by receiving a calculated signal from the GPS, and a graphics processor configured to receive, from the cluster microcomputer, graphics data of the captured image, warning light or route information displayed on the cluster display unit and deliver the same to the HUD.

The cluster display unit may include a center area positioned at a center of the cluster display unit, a left area connected to the center area and positioned on a left side of the center area, and a right area connected to the center area and positioned on a right side of the center area.

The cluster microcomputer may include a route mode for controlling the route information to be displayed in the center area, left area and right area of the cluster display unit when none of shift to a reverse gear mode, blinking of the turn signal and counterclockwise or clockwise rotation of the steering wheel of the vehicle is performed, a reverse mode for controlling the captured image corresponding to a direction of reverse of the vehicle to be displayed in the center area, left area and right area of the cluster display unit when the vehicle reverses straight, reverses to the left or reverses to the right according to a direction of rotation of the steering wheel in the reverse gear mode of the vehicle, a left turn mode for controlling the captured image of the rear left side of the vehicle to be displayed in the center area and right area of the cluster display unit and a left arrow to be displayed in the left area of the cluster display unit in a blinking manner when any one of blinking of a left turn signal and counterclockwise rotation of the steering wheel occurs in a drive gear mode of the vehicle, a right turn mode for controlling the captured image of the rear right side of the vehicle to be displayed in the center area and left area of the cluster display unit and a right arrow to displayed in the right area of the cluster display unit in a blinking manner when any one of blinking of the turn signal to the right and clockwise rotation of the steering wheel occurs in the drive gear mode of the vehicle, and a warning mode for controlling the warning light to be displayed in the left area in a blinking manner when an object approaching the vehicle from the rear left side of the vehicle is sensed by the rear sensing unit in the reverse mode, left turn mode or right turn mode and controlling the warning light to be displayed in the right area in a blinking manner when an object approaching the vehicle from the rear right side of the vehicle is sensed.

The rear capture unit may further include a vertical rotation motor having a vertical output shaft coupled with the horizontal rotation motor to enable the rear camera to capture the image of the rear center, rear left side or rear right side of the vehicle while vertically rotating, wherein, in the reverse mode, the rear camera of the rear capture unit may be controlled to rotate upward when the speed of the vehicle received from the ECU exceeds a pre-stored speed, and may be controlled to rotate downward when the speed of the vehicle is less than the pre-stored speed.

The HUD may include an HUD display panel configured to receive graphics data of each of the route mode, reverse mode, left turn mode, right turn mode and warning mode of the cluster microcomputer from the graphics processor having received the graphics data and display the same, the HUD display panel being fixedly installed in the dashboard in front of the driver's seat, a backlight fixedly installed in the dashboard in front of the driver's seat and configured to provide light to the HUD display panel, an optical system fixedly installed in the dashboard in front of the driver's seat and configured to project an enlarged or reduced version of an image displayed on the HUD display panel onto the windshield in front of the driver's seat of the vehicle, and an HUD microcomputer configured to adjust illuminance of the backlight according to an external environment for day and night.

The HUD may further include a combiner installed on the dashboard in front of the driver's seat of the vehicle so as to protrude from the dashboard or to be vertically retrievable, wherein the optical system may be fixedly installed in the dashboard in front of the driver's seat, and project an enlarged or reduced version of the image displayed on the HUD display panel onto the combiner.

The cluster may further include a shock sensor configured to sense external shock exerted on the vehicle, and a memory unit having a memory card retrievably coupled thereto to store images captured by the rear capture unit according to a detection value of the shock sensor, the memory unit automatically formatting the memory card according to a remaining memory space of the memory card or automatically deleting the captured images in a temporal order.

The HUD integrated cluster system may further include a steering angle sensor configured to detect a steering angle of the steering wheel and to transmit a value of the detected angle to the ECU, wherein the cluster microcomputer may receive the steering angle of the steering wheel and the speed of the vehicle from the ECU, and controls a horizontal capture range of the rear capture unit to be changed according to the steering angle of the steering wheel and the speed of the vehicle.

The HUD integrated cluster system may further include a side capture unit including a driver's seat side camera installed at a side mirror near the driver's seat and a front passenger seat side camera installed at a side mirror near the front passenger seat, the driver's seat side camera and the front passenger seat side camera being configured to capture images of left and right sides of the vehicle, wherein the cluster microcomputer of the cluster may receive the speed of the vehicle, the gear shift position, blinking of the turn signal, and the steering direction of the steering wheel from the ECU, and display an image captured by the side capture unit and an image captured by the rear capture unit on the cluster display unit together according to a turn direction of the vehicle and a direction of change of lanes, wherein the HUD may project, onto the windshield, the captured images from the side capture unit and the rear capture unit displayed on the cluster display unit by the graphics processor of the cluster.

The front passenger seat side camera of the side capture unit may include a front passenger seat front camera and a front passenger seat rear camera configured to capture images of a front view and rear view of the front passenger seat, wherein, when the cluster microcomputer receives, from the ECU, blinking of the turn signal toward the front passenger seat or an orientation of the steering wheel rotated to the front passenger seat in a drive gear mode, the cluster may display images captured by the front passenger seat front camera and front passenger seat rear camera and an image captured by the rear capture unit on the cluster display unit together.

The HUD integrated cluster system may further include a front capture unit installed at a front of the vehicle to capture an image of a front view of the vehicle, wherein the cluster microcomputer of the cluster may receive the speed of the vehicle and the gearshift position from the ECU, and when the speed of the vehicle is less than or equal to a certain speed in a drive gear mode, the cluster displays the captured image from the front capture unit on the cluster display unit, wherein the HUD may project, onto the windshield, the captured image of the front capture unit displayed on the cluster display unit by the graphics processor of the cluster.

An HUD integrated cluster system for a vehicle camera according to an embodiment of the present invention displays captured images of the rear view of the vehicle on a cluster and an HUD in front of the driver's seat. Thereby, the gaze shift distance and gaze shift time may be reduced in watching the environment behind the vehicle and a traffic accident resulting from distraction from the front view may be prevented.

Second, the HUD integrated cluster system displays, on the cluster and the HUD in front of the driver's seat, an image of at least one of the views of the rear center, rear left side and rear right side of the vehicle according to the speed of the vehicle, gear shift, blinking of a turn signal, and a steering direction of the steering wheel. Thereby, the driver may easily observe the rear view according to respective situations.

Third, the HUD integrated cluster system displays a captured image of a rear view of the vehicle and a warning light according to an object which is positioned near or is approaching the vehicle. Thereby, the driver's attention may be readily drawn when the vehicle reverses or changes lanes.

Fourth, the HUD integrated cluster system displays, on a part in front of the driver's seat, rear view images corresponding to the driver's seat and the front passenger seat and a captured image of an object which is positioned in front of the front passenger seat and is not easily visible from the driver's seat due to a front object. Thereby, lane change to a right may be facilitated.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

According to an embodiment of the present invention, an head-up display (HUD) integrated cluster system for a vehicle camera includes a rear capture unit 100, a rear sensing unit 200, a cluster 300, and an HUD 400, as shown in FIGS. 4 to 24.

Figure 1:
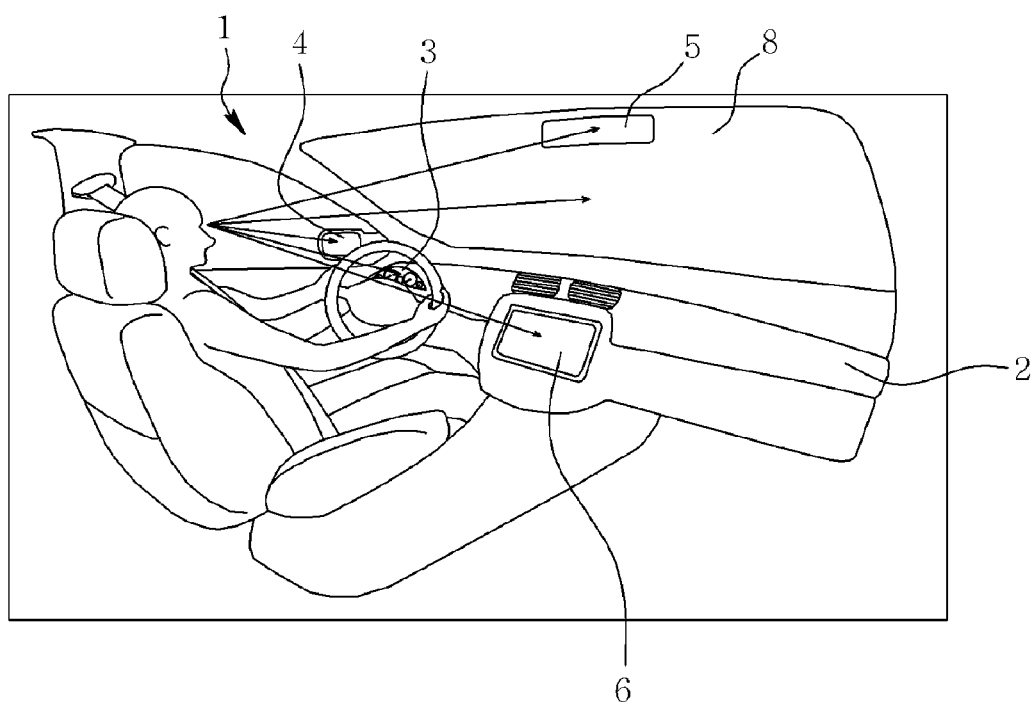
FIG. 1 is a perspective view illustrating gaze shifts of the driver in a vehicle, which are indicated by arrows.
Figure 2:
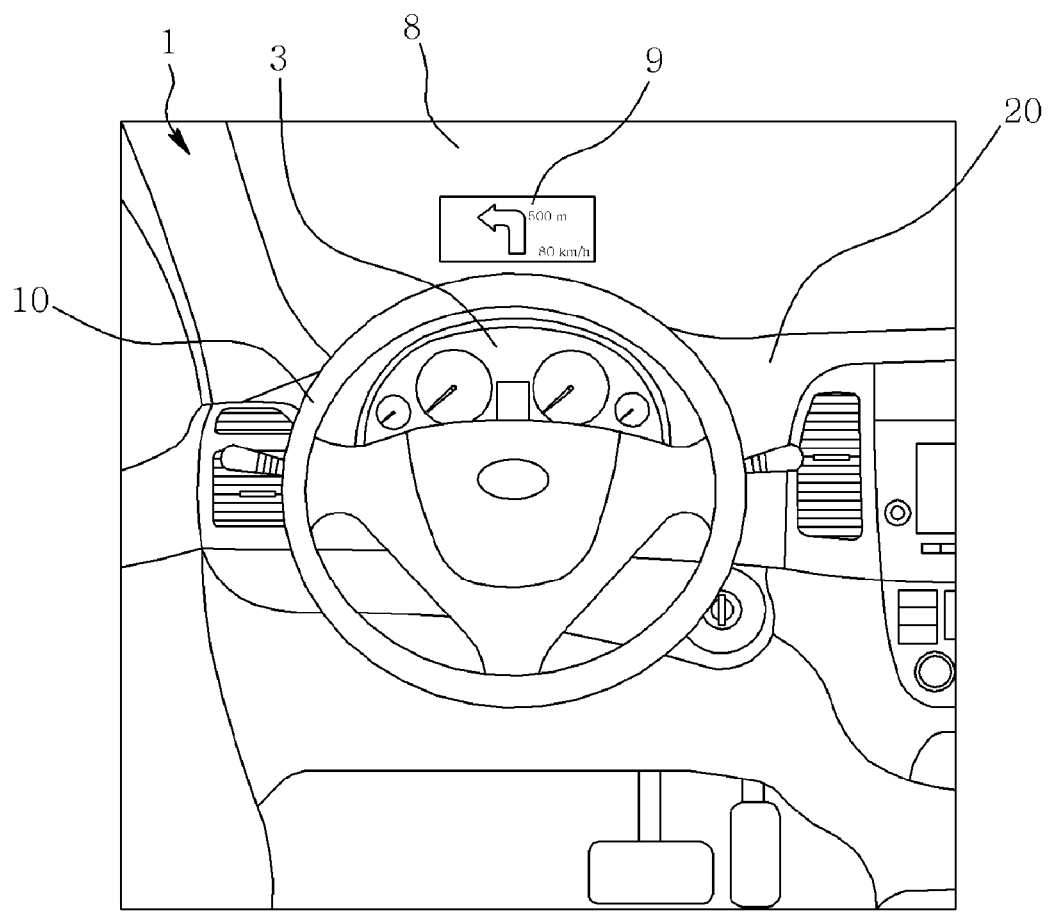
FIG. 2 is a perspective view illustrating an internal portion of a vehicle which is in front of the driver's seat and is provided with a vehicle cluster and an HUD according to the prior art.
Figure 3:
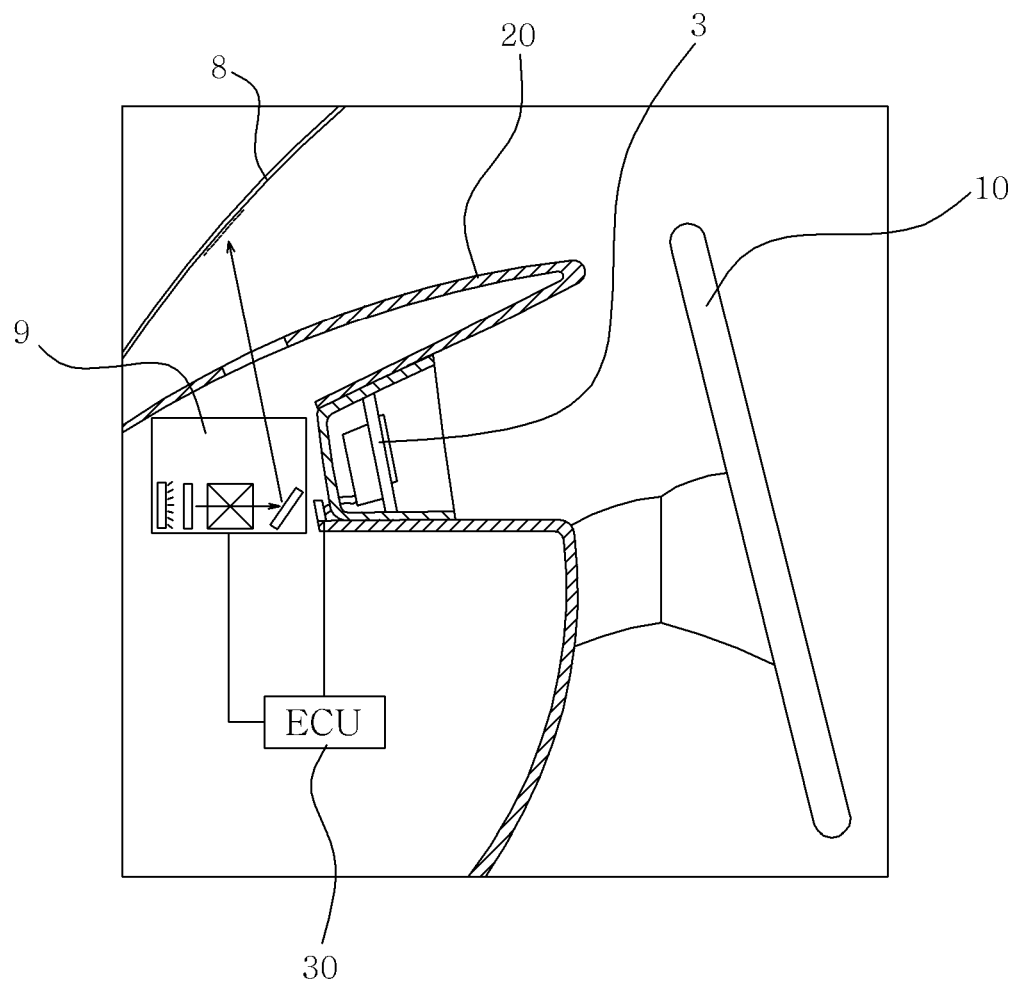
FIG. 3 is a cross-sectional view illustrating an internal portion of a vehicle in front of the driver's seat, which is based on the example of FIG. 2.
Figure 4:
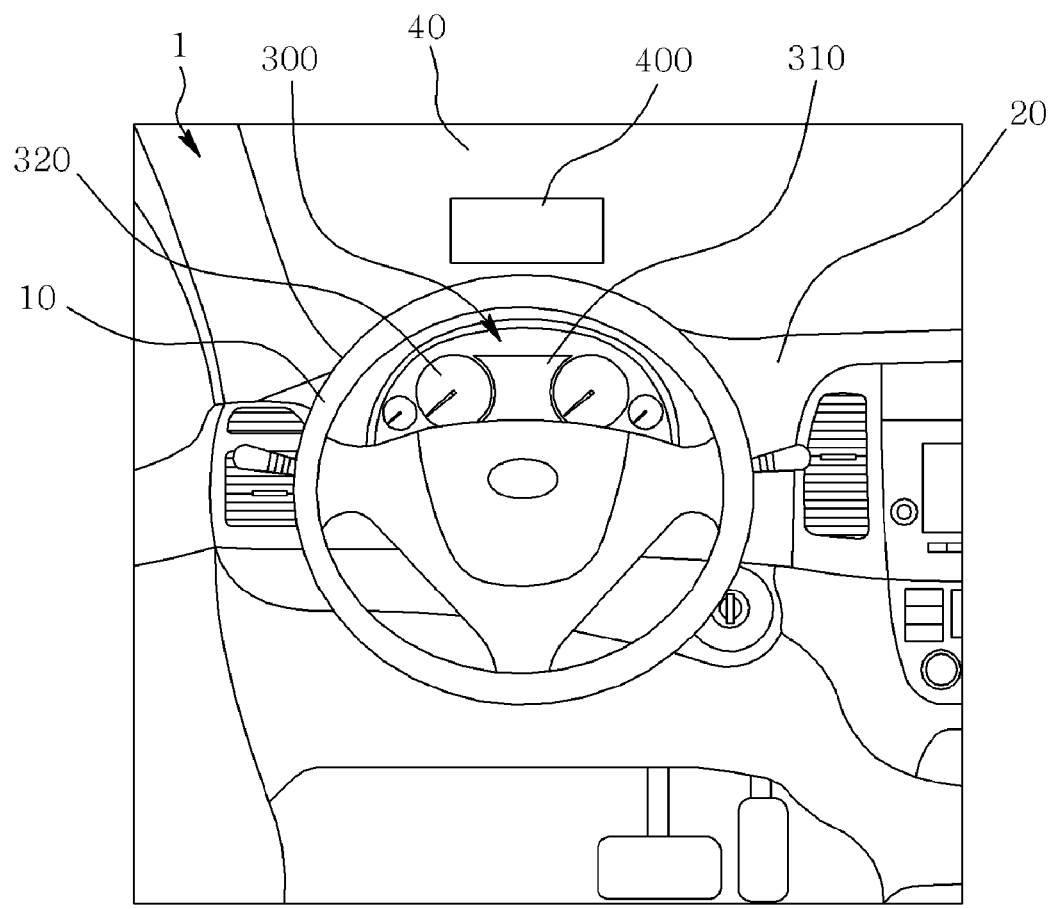
FIG. 4 is a perspective view illustrating an internal portion of a vehicle which is in front of the driver's seat and is provided with a cluster and an HUD in an HUD integrated cluster system for a vehicle camera according to a first embodiment of the present invention.
Figure 5:
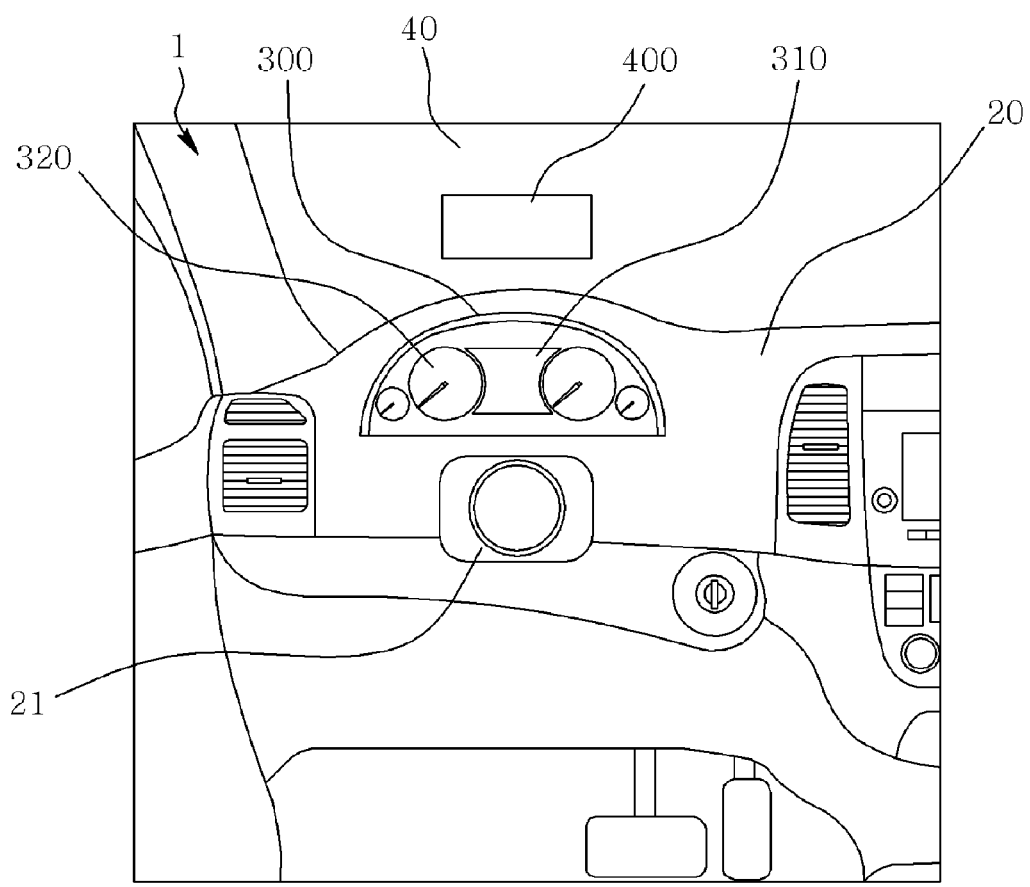
FIG. 5 is a perspective view illustrating the embodiment of FIG. 4 with the steering wheel removed.
Figure 6:
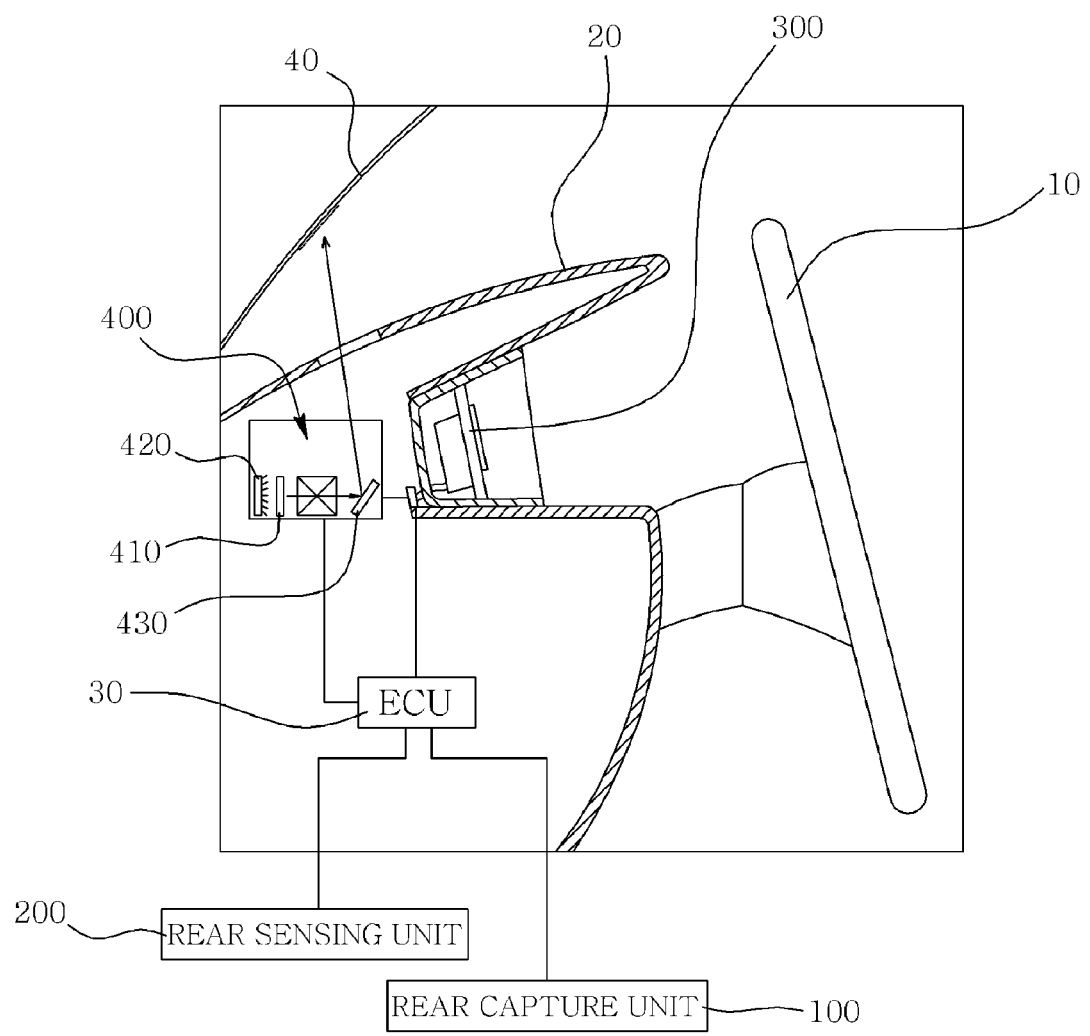
FIG. 6 is a cross-sectional view illustrating an internal portion of a vehicle which is in front of the driver's seat according to the embodiment of FIG. 4.
Figure 7:
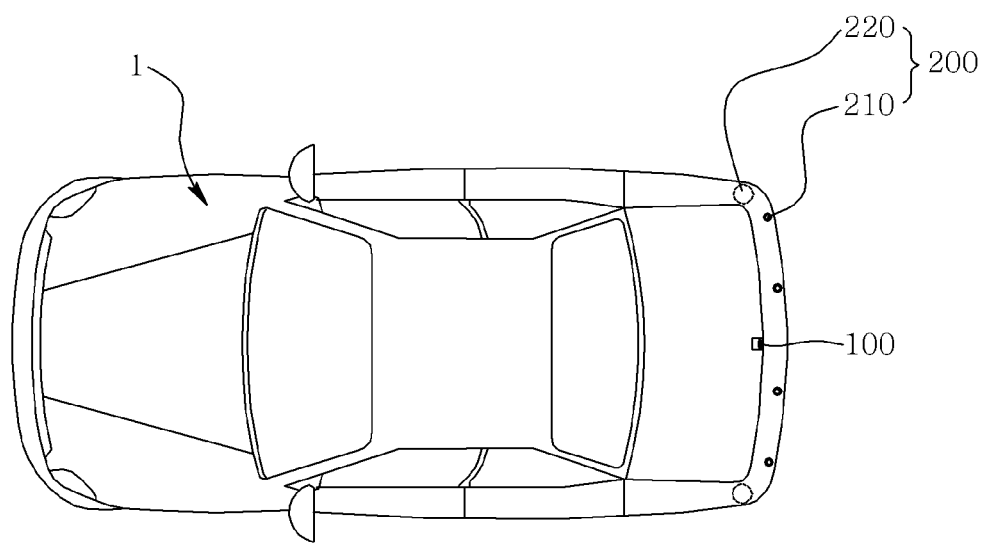
FIG. 7 is a plan view illustrating the exterior of the vehicle according to the embodiment of FIGS. 4 and 6.
Figure 8:
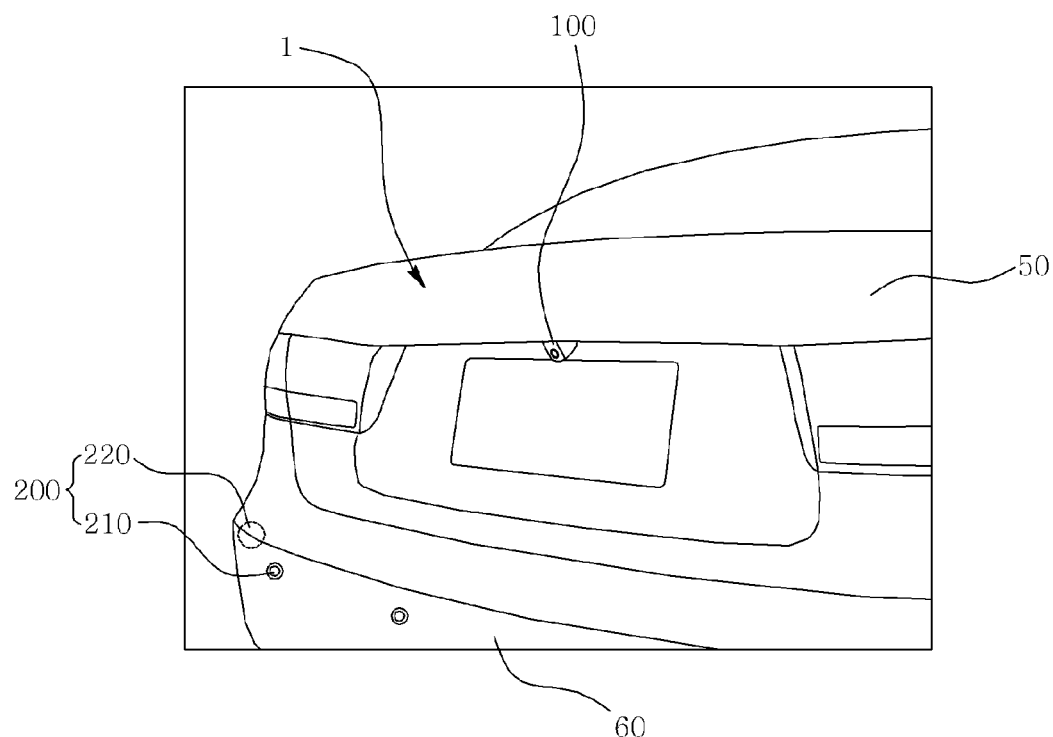
FIG. 8 is an enlarged perspective view illustrating a rear capture unit and a rear monitor according to the embodiment of FIG. 7.
Figure 9:
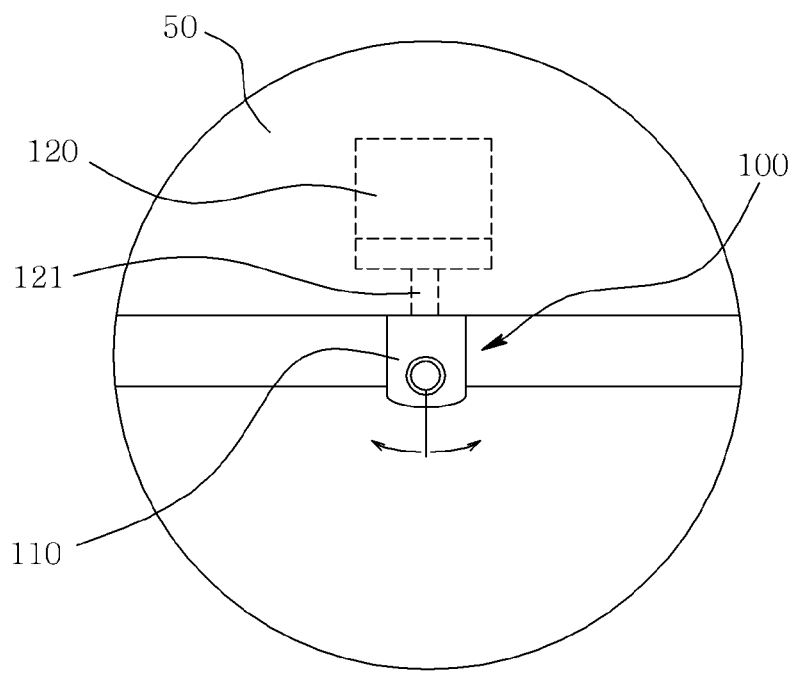
FIG. 9 is an enlarged plan view illustrating the rear capture unit according to the embodiment of FIG. 8.
Figure 10:
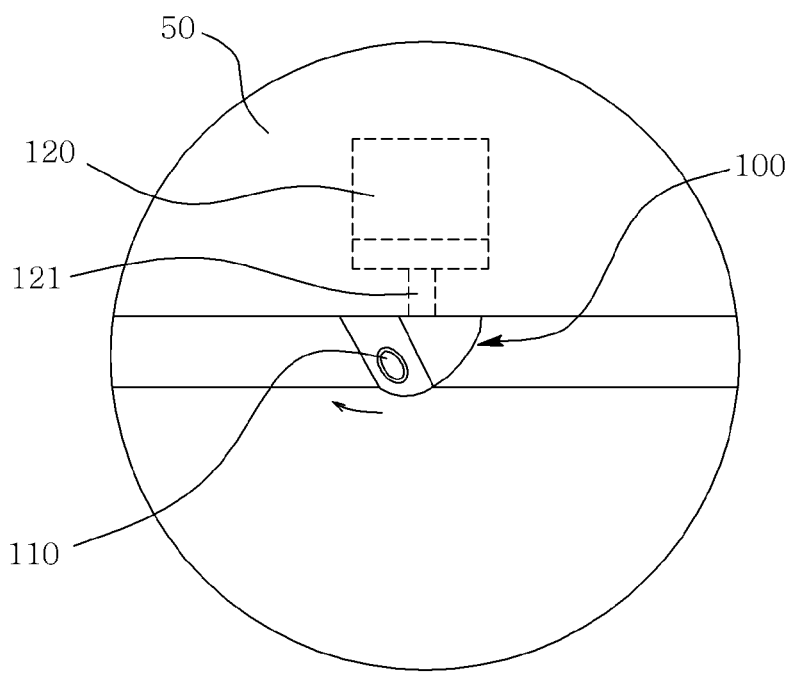
FIG. 10 is a plan view illustrating the rear camera horizontally rotated according to the embodiment of FIG. 9.
Figure 11:
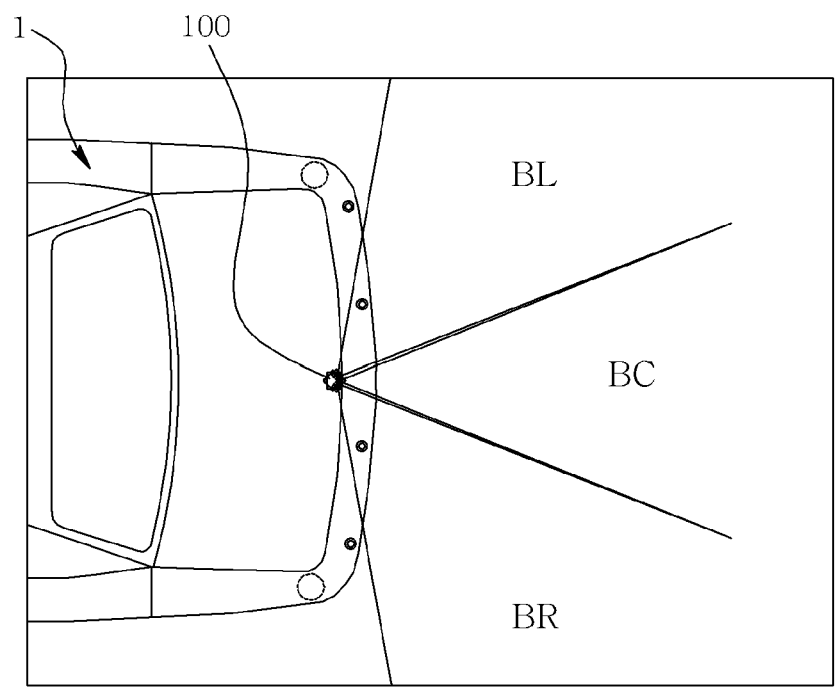
FIG. 11 is a plan view illustrating a capture range of the rear capture unit according to the embodiment of FIG. 8.
Figure 12:
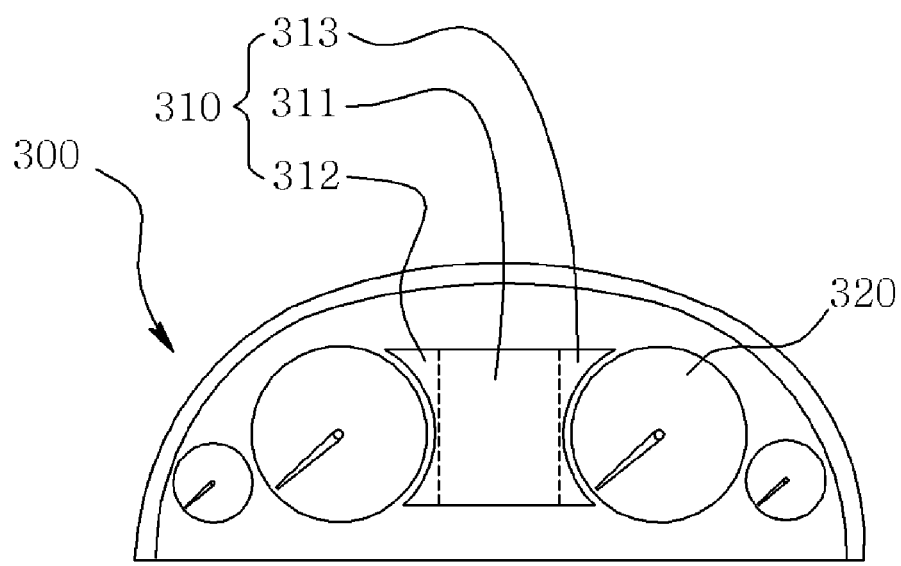
FIG. 12 is an enlarged view illustrating the cluster according to the embodiment of FIG. 5.

As shown in FIGS. 6 to 11 and 13, the rear capture unit 100 includes a rear camera 110 horizontally rotatably coupled to the back of the vehicle to capture an image of the rear center BC, rear left side BL, or rear right side BR. The rear capture unit 100 further includes a horizontal rotation motor 120 which is installed at the back of the vehicle to horizontally rotate the rear camera and is provided with a horizontal output shaft 121, to which the rear camera 110 is coupled. Herein, the rear capture unit 100 may be installed on the trunk 50, which is positioned at the back of the vehicle 1, as shown in FIG. 8. In addition, the captured image may be delivered to an ECU 30, which is configured to receive information from various sensors installed in the vehicle 1, and then transmitted to the cluster 300, which will be described later.

Configuring the rear camera 110 to capture an image of the rear center BC, rear left side BL or rear right side BR of the vehicle 1 through the horizontal rotation motor 120 is intended to allow a cluster microcomputer 340 of the cluster 300, which will be described later, to receive the speed of the vehicle 1, gear shift, blinking of a turn signal, and the steering direction of the steering wheel from the ECU 30 and to capture an image of a rear area according to a situation through control of the cluster microcomputer 340.

As shown in FIGS. 6 to 8 and 13, the rear sensing unit 200 may be installed at a plurality of places of the back of the vehicle to sense an object which is positioned near or approaches the rear center and rear left and right sides of the vehicle 1. To this end, the rear sensing unit 200 includes at least one of an ultrasonic sensor 210 and a radar sensor 220. Herein, the ultrasonic sensor 210 is a sensor for detecting the distance to an object according to the transmission time and reception time of an ultrasonic wave, and the radar sensor 220 is a sensor for detecting the distance to an object according to the transmission time and reception time of an electromagnetic wave. The sensing range of the radar sensor 220 is wider than that of the ultrasonic sensor, and the response time of the radar sensor 220 is shorter than that of the ultrasonic sensor. For example, as shown in FIGS. 7 and 8, a plurality of ultrasonic sensors 210 may be installed in the longitudinal direction of the rear bumper 60 to detect an object at a close distance in cases of backward parking and low-speed reversing, and may be installed at both left and right edges of the rear bumper 60 to detect an object on a rear side of the vehicle when the vehicle changes lanes or turns left or right during driving. The objects which are positioned near or approach the rear center and rear left and right sides of the vehicle 1 refer to hindrances to driving such as humans, vehicles and obstacles.

As shown in FIGS. 4 to 6, 12 and 13, the cluster 300 is installed on a dashboard 20, which is installed in front of the steering wheel 10 of the vehicle 1. In addition, the cluster 300 is electrically connected to the ECU 30, which receives information from various sensors installed in the vehicle 1, to display current driving conditions of the vehicle. In addition, the cluster 300 includes a cluster display unit 310, a driving condition display unit 320, a global positioning system (GPS) 330, a cluster microcomputer 340, and a graphics processor 350. The electronic control unit (ECU) 30 may be viewed as a computer for use in a vehicle. The ECU 30 has a RAM and a ROM. The RAM of the ECU 30 functions to temporarily store various signals which are generated during travelling of the vehicle, and the ROM is provided at the stage of design as control data for movement of the vehicle. As soon as the vehicle is turned on, the ECU 30 receives information from various sensors installed in the vehicle, for example, a sensor for checking the rotations per minute and the amount of engine oil, which are related to the engine, a temperature sensor related to cooling and heating, an airbag sensor and seatbelt sensor related to safety, and a speed sensor, an ABS sensor and a left turn/right turn sensor related to movement of the vehicle. Herein, communication of all signals received by or transmitted from the ECU 30 conforms to CAN communication, which is a communication standard for vehicles. The function and operation of the ECU 30 and the various sensors installed in the vehicle 1 are widely known in the conventional automobile technology, and thus a detailed description thereof is omitted.

Specifically, the cluster display unit 310 is a means to display a warning light in a blinking manner according to a sensed value of the rear sensing unit 200 while displaying route information related to the location and route of the vehicle 1 or at least one of images of the rear center, rear left side and rear right side of the vehicle captured by the rear capture unit 100. As the cluster display unit 310, an LCD panel for displaying digital data such as captured images may be used. Herein, the cluster display unit 310 includes a center area 311 positioned at the center of the cluster display unit 310, a left area 312 connected to the center area 311 and positioned on the left side of the center area 311, and a right area 313 connected to the center area 311 and positioned on the right side of the center area 311. Providing the center area 311, left area 312, and right area 313 of the cluster display unit 310 is intended to display, on one display means, the images of the rear center, rear left side and rear right side of the vehicle captured by the rear capture unit 100 in different styles. Thereby, the driver may easily check the situation behind the vehicle using one display means. Further details will be described in relation to the cluster microcomputer 340 later.

The driving condition display unit 320 is a means to receive driving condition data of the vehicle 1 from the ECU 30 and display current driving conditions of the vehicle such as the speed and the amount of fuel in an analog or digital manner. Alternatively, the driving conditions may be displayed in combination of the analog manner and the digital manner. Herein, in the analog display, driving condition information such as the speed and the rate of rotation is indicated by a pointer operated by a drive motor. In the digital display, the driving condition information such as the speed and the rate of rotation is displayed on the display panel using accurate numerical values of digital data. For example, the driving condition display unit 320 may display a speedometer, an RPM, an ABS, a fuel gauge, a seatbelt warning light, a coolant thermometer, a high beam indication light, an engine oil warning light, a battery warning light, and other warning lights and indication lights.

The GPS 330 receives a GPS signal, thereby computing information related to the location and route of the vehicle 1 and transmitting the computed route information related to the position and route of the vehicle 1 to the cluster display unit 310. This is intended to display route information related to the location and route of the vehicle 1, namely, a navigation function on the cluster display unit 310.

The cluster microcomputer 340 is a means to receive a sensed value of the rear sensing unit 200 and control a captured image from the rear capture unit 100 and warning lights to be displayed on the cluster display unit 310. That is, the cluster microcomputer 340 receives the speed of the vehicle, the gear shift position, blinking of a turn signal, and the steering direction of the steering wheel from the ECU 30, thereby controlling the rear capture unit 100 to selectively capture an image of the rear center, rear left side or rear right side of the vehicle. The cluster microcomputer 340 also receives a signal from the GPS 330, thereby controlling the route information to be displayed on the cluster display unit 310. To this end, the cluster microcomputer 340 includes a route mode 341, a reverse mode 342, a left turn mode 343, a right turn mode 344, and a warning mode 345.

Figure 13:
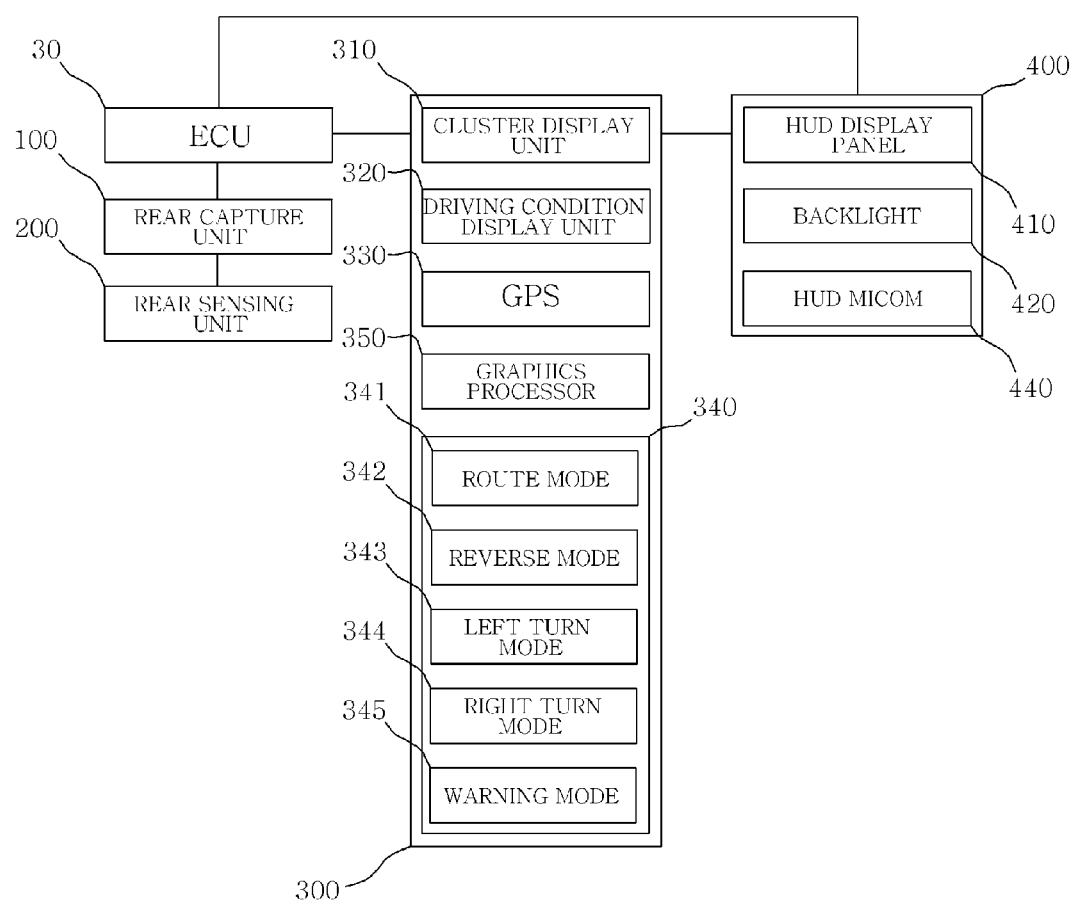
FIG. 13 is a system block diagram illustrating detailed configurations of the cluster and the HUD according to the embodiment of FIGS. 4 and 6.
Figure 14:
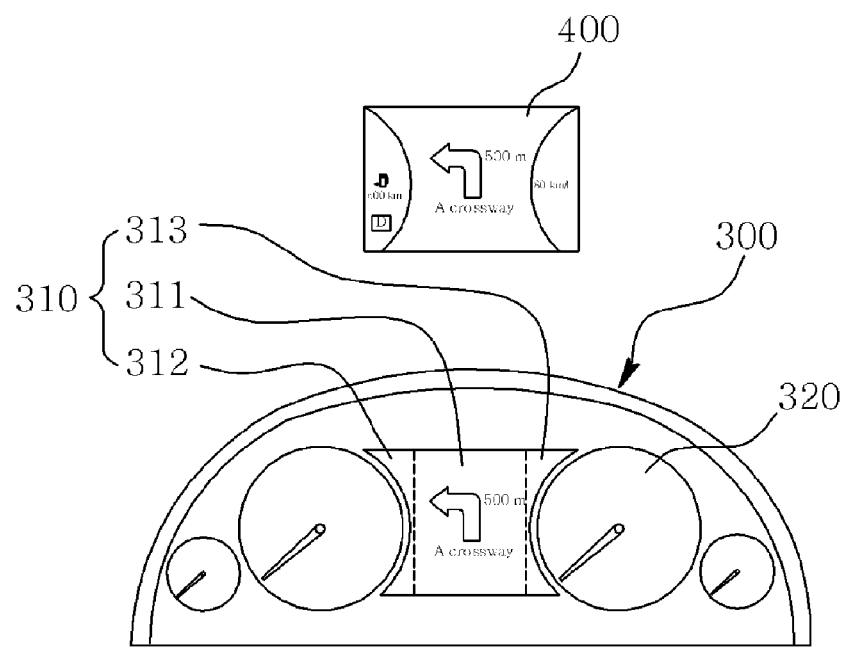
FIG. 14 is a view illustrating the cluster and HUD in a route mode according to the embodiment of FIG. 13.

The route mode 341 is a mode for controlling the route information to be displayed in the center area 311, left area 312 and right area 313 of the cluster display unit 310 in the event that no action for shift to the reverse gear, blinking of a turn signal, and counterclockwise or clockwise rotation of the steering wheel 10 of the vehicle 1 is taken, as shown in FIGS. 13 and 14. That is, if no action to execute the reverse mode 342, left turn mode 343, right turn mode 344 and warning mode 345 is taken, the navigation function is performed with, for example, the route information.

Figure 15:
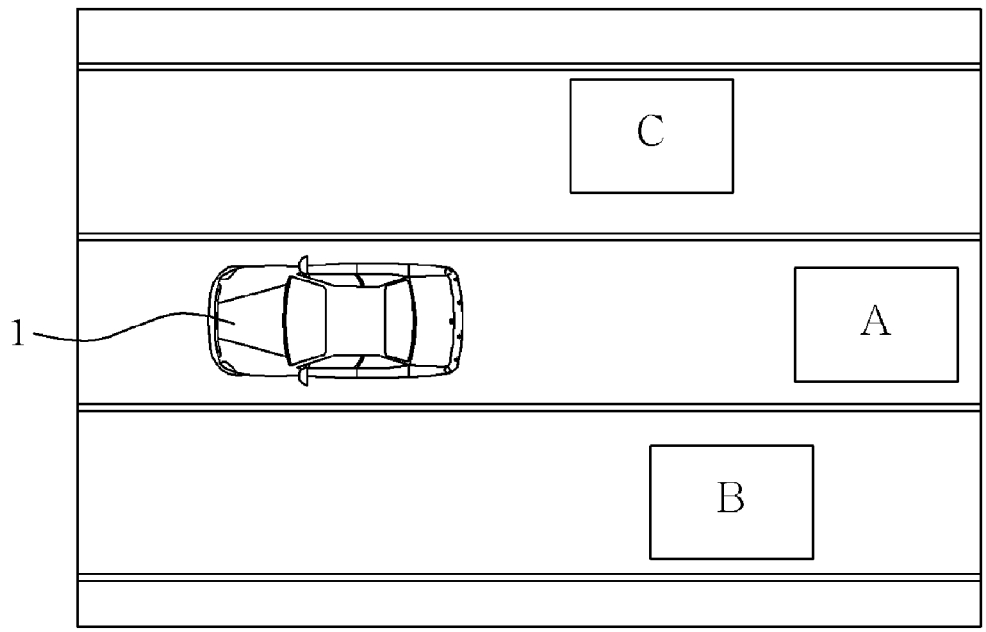
FIG. 15 illustrates an example of objects which are positioned or approach from behind the vehicle, for illustration of the reverse mode, left turn mode, right turn mode and warning mode according to the embodiment of FIG. 13.
Figure 16:
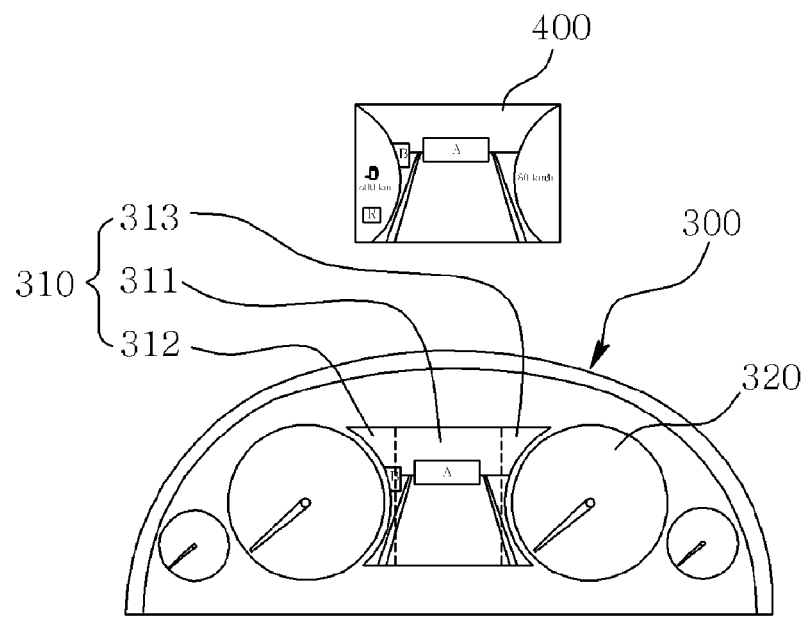
FIG. 16 is a view illustrating the cluster and HUD in the reverse mode according to the embodiment of FIG. 15.

The reverse mode 342 is a mode for controlling a captured image corresponding to the direction of reverse of the vehicle to be displayed in the center area 311, left area 312 and right area 313 of the cluster display unit 310 when the vehicle reverses straight, reverses to the left or reverses to the right according to the direction of rotation of the steering wheel 10 in the reverse gear mode of the vehicle 1, as shown in FIGS. 13, 15 and 16. For example, FIG. 16 illustrates a case where the vehicle is moved directly backward in the environment behind the vehicle 1 given as shown in FIG. 15. In this case, the rear capture unit 100 captures an image of the rear center BC of the vehicle, and the captured image from the rear capture unit 100 is displayed on the cluster display unit 310.

Figure 19:
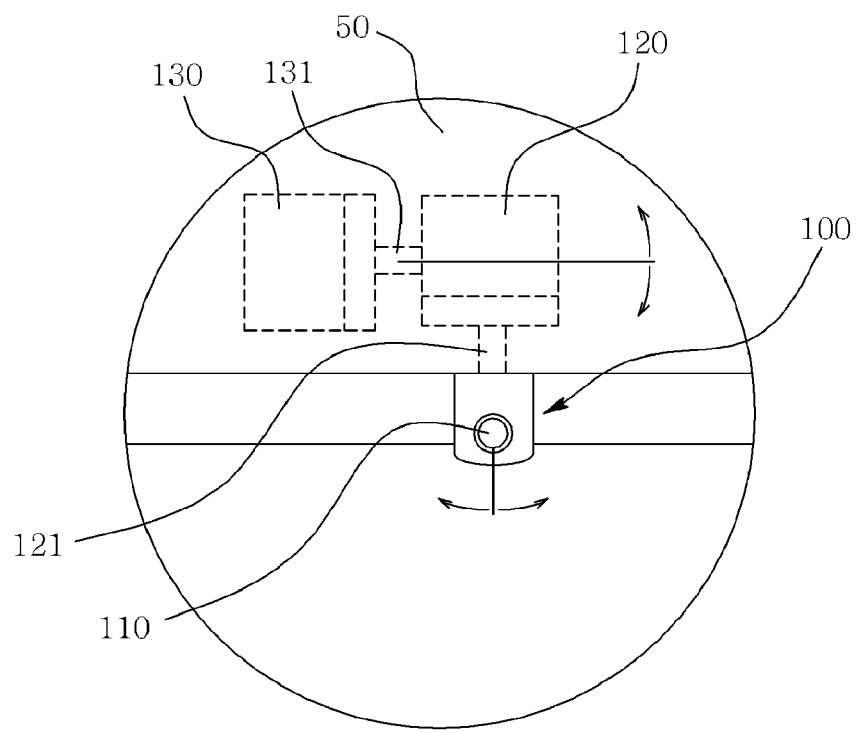
FIGS. 19 and 20 are a plan view and a side view illustrating another example of the rear capture unit according to the embodiment of FIG. 9.
Figure 20:
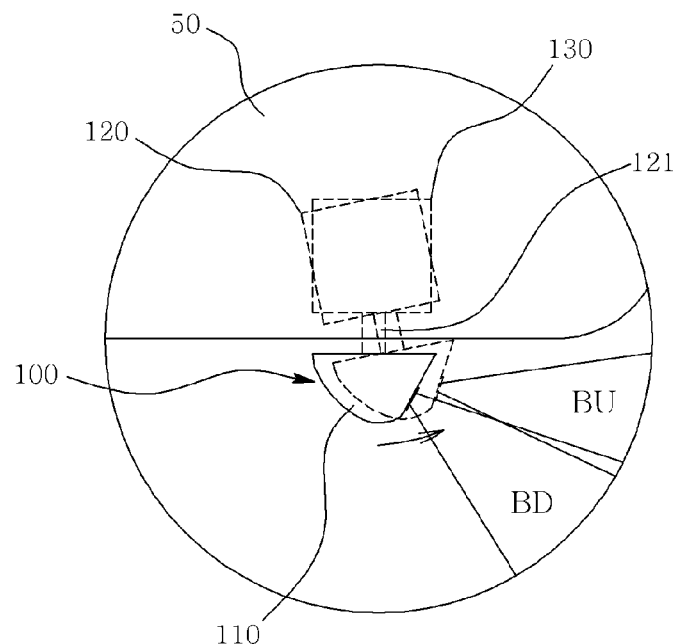

Herein, in the reverse mode 342, the captured image may be controlled to be displayed on the cluster display unit 310 by changing the vertical angle of the rear capture unit 100 according to the speed of the vehicle 1. To this end, the rear capture unit 100 further includes a vertical rotation motor 130 having a vertical output shaft 131 coupled with the horizontal rotation motor 120 to enable the rear camera 110 to capture an image of the rear center, rear left side or rear right side of the vehicle while vertically rotating, as shown in FIGS. 19 and 20. In addition, in the reverse mode 342, the speed of the vehicle 1 is received from the ECU 30. If the speed of the vehicle 1 exceeds a pre-stored speed, the rear camera 110 of the rear capture unit 100 is controlled to rotate upward. If the speed of the vehicle 1 is less than the pre-stored speed, the rear camera 110 of the rear capture unit 100 is controlled to rotate downward. This is because low-speed backward parking requires only images of an environment within 10 m from the back of the vehicle, while backward driving requires images of an environment farther from the back of the vehicle than the environment for backward parking in consideration of reverse speed.

Figure 17:
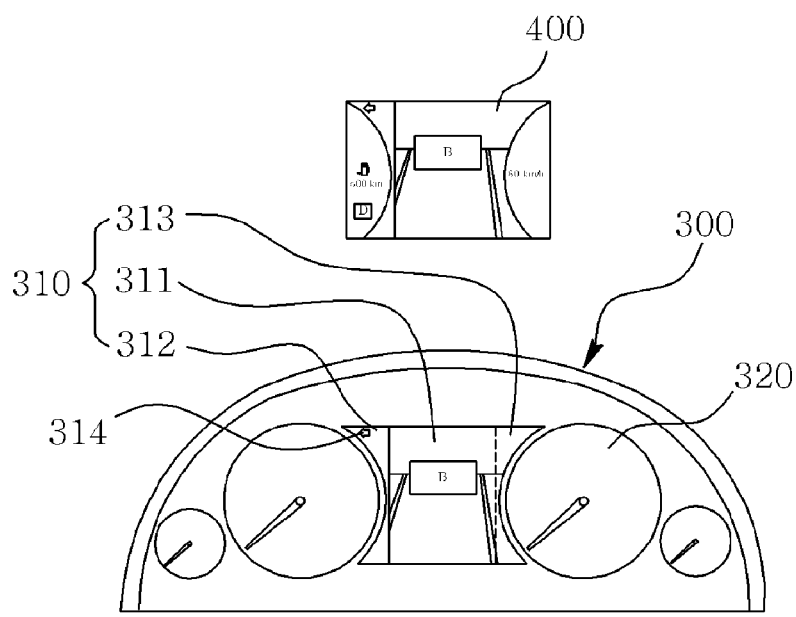
FIG. 17 is a view illustrating the cluster and HUD in the left turn mode according to the embodiment of FIG. 15.

As shown in FIGS. 13, 15 and 17, the left turn mode 343 is a mode for controlling a captured image of the rear left side of the vehicle 1 to be displayed in the center area 311 and right area 313 of the cluster display unit 310 and a left arrow 314 to be displayed in the left area 312 of the cluster display unit 310 in a blinking manner if any one of blinking of a left turn signal and counterclockwise rotation of the steering wheel 10 occurs in the drive gear mode of the vehicle 1. For example, FIG. 17 illustrates a case where the rear capture unit 100 captures an image of the rear left side BL of the vehicle and the captured image from the rear capture unit 100 is displayed on the cluster display unit 310 when objects A, B and C shown in FIG. 15 are positioned or approaching from behind the vehicle 1 while the left turn signal blinks or the steering wheel 10 is rotated counterclockwise to change lanes.

Figure 18:
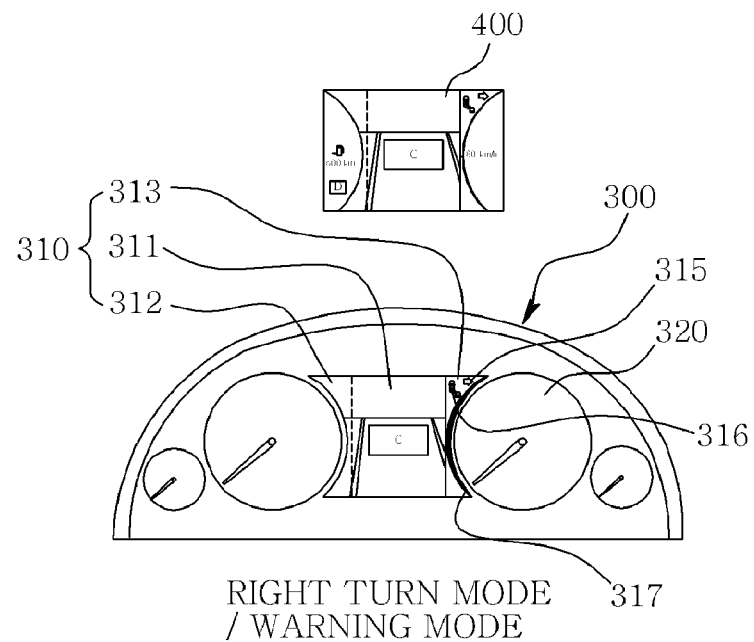
FIG. 18 is a view illustrating the cluster and HUD in the right turn mode and warning mode according to the embodiment of FIG. 15.

The right turn mode 344 is a mode for controlling a captured image of the rear right side of the vehicle to be displayed in the center area 311 and left area 312 of the cluster display unit 310 and a right arrow to be displayed in the right area 313 of the cluster display unit 310 in a blinking manner when any one of blinking of the right turn signal and clockwise rotation of the steering wheel 10 occurs in the drive gear mode of the vehicle 1, as shown in FIGS. 13, 15 and 18.

The warning mode 345 is a mode for controlling a warning light to be displayed in the left area 312 in a blinking manner when an object approaching the vehicle 1 from the rear left side of the vehicle 1 is sensed by the rear sensing unit 200 in the reverse mode 342, left turn mode 343 or right turn mode 344 and controlling a warning light to be displayed in the right area 313 in a blinking manner when an object approaching the vehicle 1 from the rear right side of the vehicle 1 is sensed. That is, the warning mode 345 is a mode for sensing, through the rear sensing unit 200, an object positioned in or approaching a blind spot at the rear side of the vehicle which is invisible through the rearview mirror and left and right side mirrors including the rear center of the vehicle and calling the driver's attention. For example, FIG. 18 illustrates a case where an image of the rear right side BR of the vehicle 1 is captured by the rear capture unit 100 and displayed on the cluster display unit 310 when the right turn signal blinks or the steering wheel is rotated clockwise to change lanes in the environment behind the vehicle 1 given as shown in FIG. 15, and warning lights 316, 317 for warning the driver are displayed in a blinking manner to prevent the vehicle 1 from changing lanes when it is sensed that an object C is on the rear right side BR of the vehicle 1 and is within a pre-stored distance.

Figure 21:
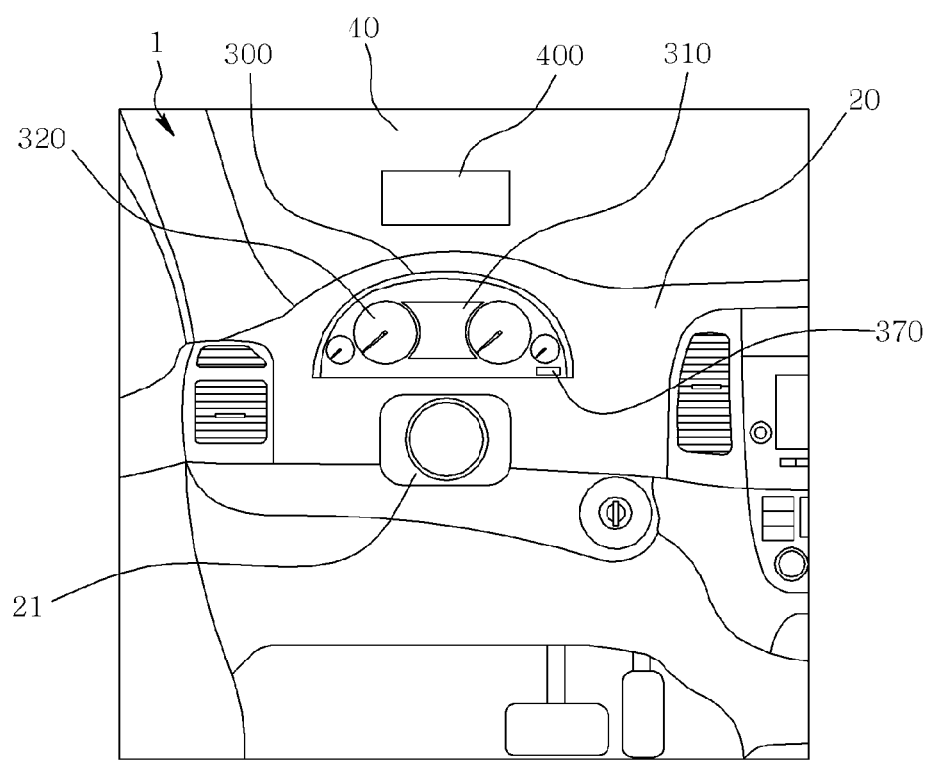
FIG. 21 is a perspective view illustrating another example of the cluster according to the embodiment of FIG. 5.
Figure 22:
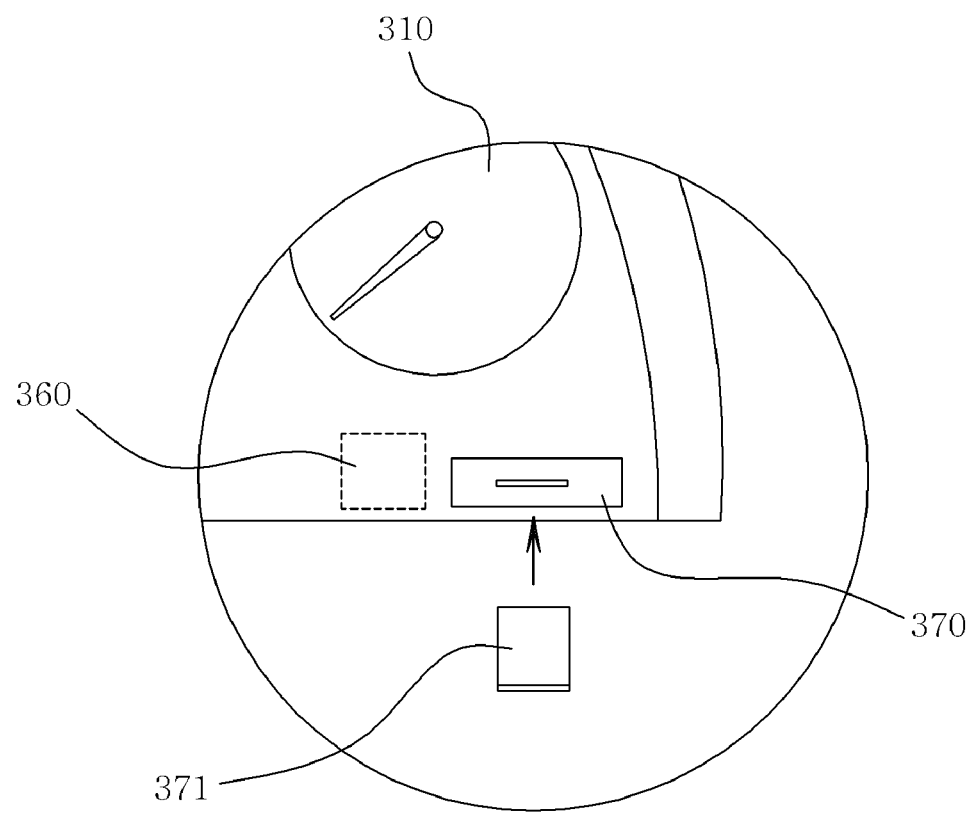
FIG. 22 is an enlarged perspective view illustrating a memory unit according to the embodiment of FIG. 21.
Figure 23:
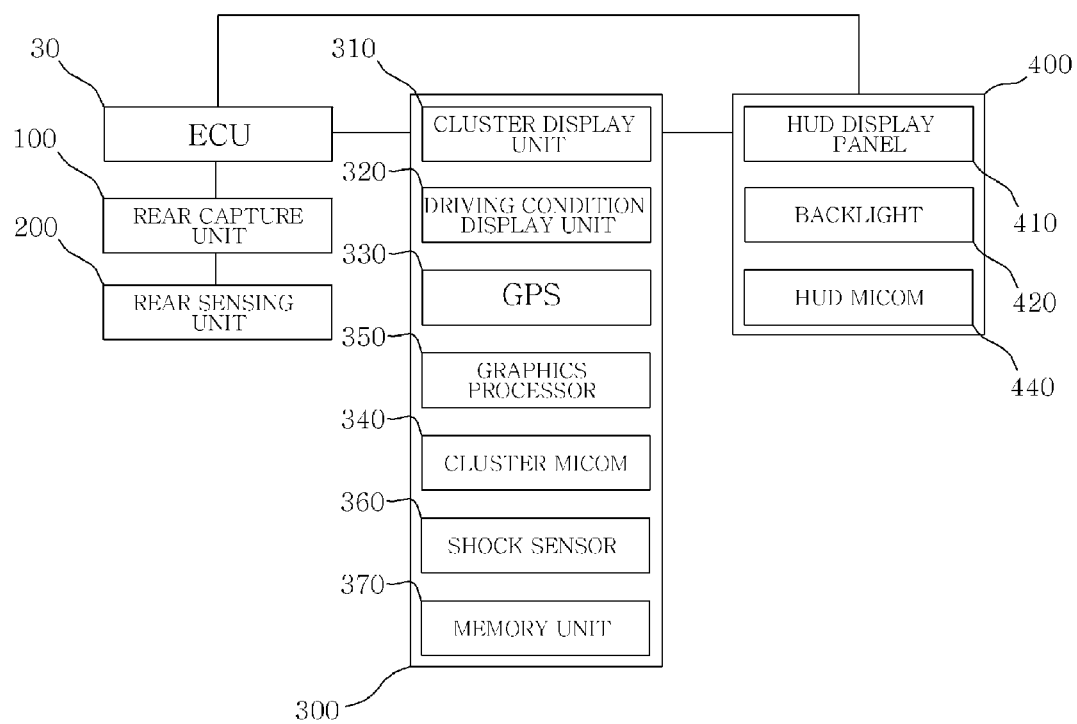
FIG. 23 is a system block diagram according to the embodiment of FIG. 21.

The cluster 300 may further include a shock sensor 360 and a memory unit 370, as shown in FIGS. 21 to 23. The shock sensor 360 is a means to sense external shock exerted on the vehicle 1, and the memory unit 370 is a means retrievably coupled to a memory card 371 to store images captured by the rear capture unit 100 according to a detection value of the shock sensor 360. The memory unit 370 automatically formats the memory card 371 according to the remaining memory space of the memory card 371 or automatically deletes captured images in a temporal order. For example, if a shock detection value greater than or equal to a pre-stored shock is sensed by the shock sensor 360, the memory unit 370 may be programmed to store images captured for 30 seconds before and after the time at which the shock is sensed. Accordingly, when a traffic accident occurs in the rear area whose images are being captured by the rear capture unit 100, the captured images may be used as reference data. The captured images may be more accurate than images captured by a black box, which simply captures rearview images without changing the horizontal capture angle.

As shown in FIGS. 4 to 6 and 13, the HUD 400 is electrically connected to the cluster 300 and ECU 30, and is installed in the dashboard 20 in front of the driver's seat in the vehicle 1 to display current conditions of the vehicle 1 and project the image and warning lights displayed on the cluster display unit 310 of the cluster 300 onto the windshield 40 in front of the driver's seat. The HUD 400 includes a HUD display panel 410, a backlight 420, an optical system 430, and a HUD microcomputer 440.

Specifically, the HUD display panel 410 receives graphics data of the route mode 341, reverse mode 342, left turn mode 343, right turn mode 344, and warning mode 345 from the graphics processor 350, and displays the same. The HUD display panel 410 is fixedly installed in the dashboard 20 in front of the driver's seat.

The backlight 420 is fixedly installed in the dashboard 20 in front of the driver's seat, and serves as a means to provide light to the HUD display panel 410.

The optical system 430 is fixedly installed in the dashboard 20 in front of the driver's seat. The optical system 430 is a means to project an enlarged or reduced version of an image displayed on the HUD display panel 410 onto the windshield 40 in front of the driver's seat of the vehicle 1.

The HUD microcomputer 440 is a means to adjust illuminance of the backlight 420 according to the external environment for day and night.

As shown in FIGS. 14 and 16 to 18, the HUD 400 displays, on the windshield 40, an image identical to the image displayed on the cluster 300. While an image identical to the image displayed on the cluster 300 is displayed, basic driving condition information such as the speed and the amount of fuel may also be displayed.

Figure 24:
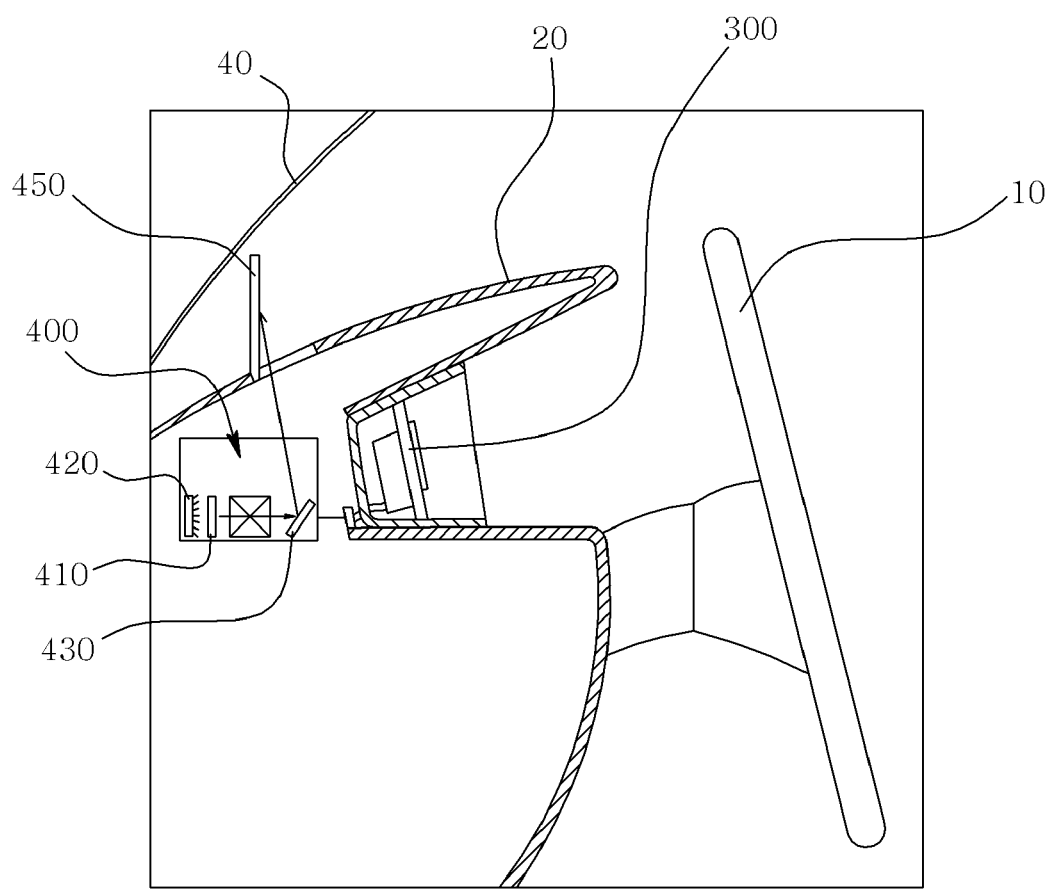
FIG. 24 is a cross-sectional view illustrating another example of the HUD according to the embodiment of FIG. 6.
Figure 25:
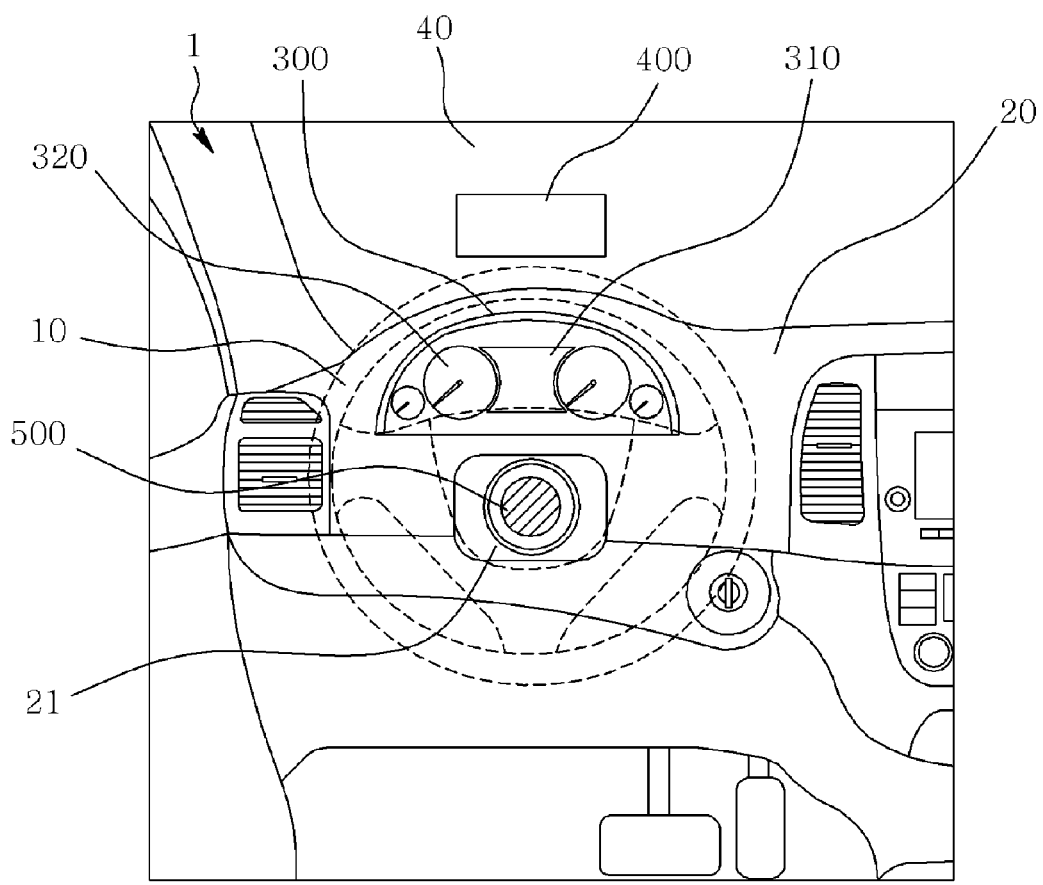
FIG. 25 is a perspective view illustrating an internal portion of a vehicle which is in front of the driver's seat and is provided with a steering angle sensor in an HUD integrated cluster system for a vehicle camera according to a second embodiment of the present invention.
Figure 26:
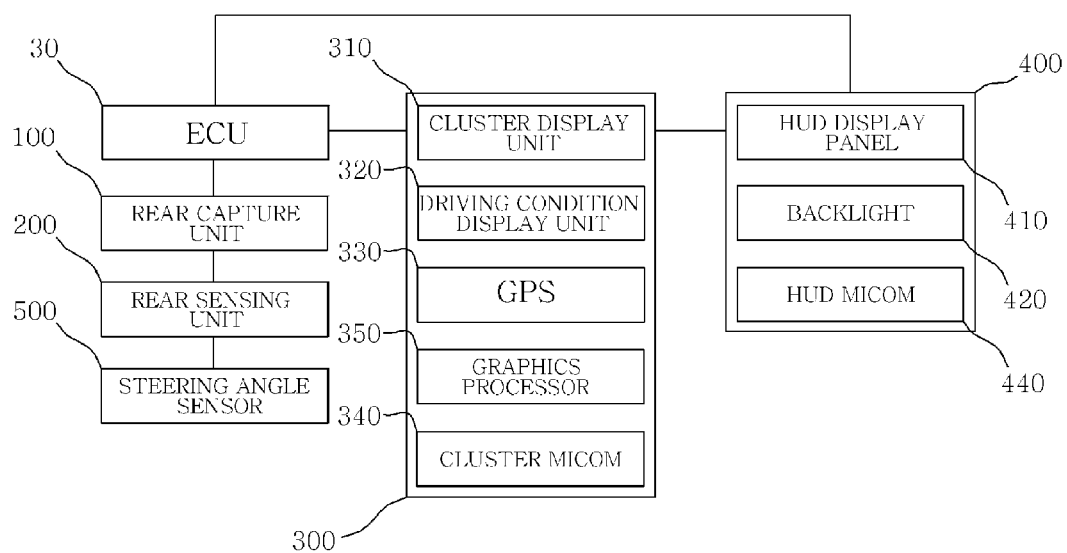
FIG. 26 is a system block diagram according to the embodiment of FIG. 25.

In addition, as shown in FIG. 24, the HUD 400 may be configured as a combiner HUD (C-HUD). To this end, the HUD 400 further includes a combiner 450. The combiner 450 protrudes from the dashboard 20 in front of the driver's seat of the vehicle or is installed on the dashboard 20 so as to be vertically retrievable. The combiner 450 is formed of a transparent member in order not to obstruct the front view. The optical system 430 is fixedly installed in the dashboard 20 in front of the driver's seat, and allows an enlarged or reduced version of an image displayed on the HUD display panel 410 to be projected onto the combiner 450.

According to a second embodiment of the present invention, an HUD integrated cluster system for a vehicle camera includes a rear capture unit 100, a rear sensing unit 200, a cluster 300, a HUD 400, and a steering angle sensor 500, as shown in FIGS. 25 to 28. Redundant description of elements described in the first embodiment in detail will be omitted.

The steering angle sensor 500 is a means to detect a steering angle of the steering wheel 10 and transmit the detected value to the ECU 30. The steering angle sensor 500 may be installed on a steering wheel mount 21 provided to the dashboard 20.

Figure 27:
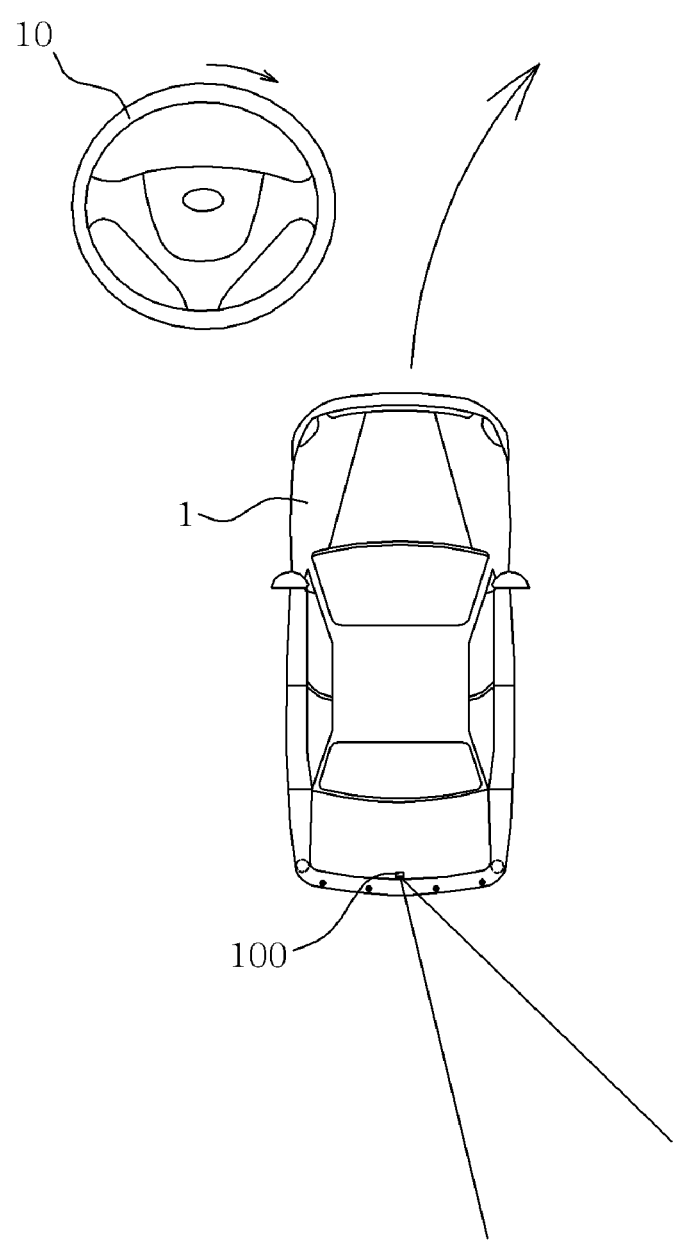
FIGS. 27 and 28 are plan views illustrating a capture range of a rear capture unit according to a steering angle of a steering wheel in the embodiment of FIG. 25.
Figure 28:
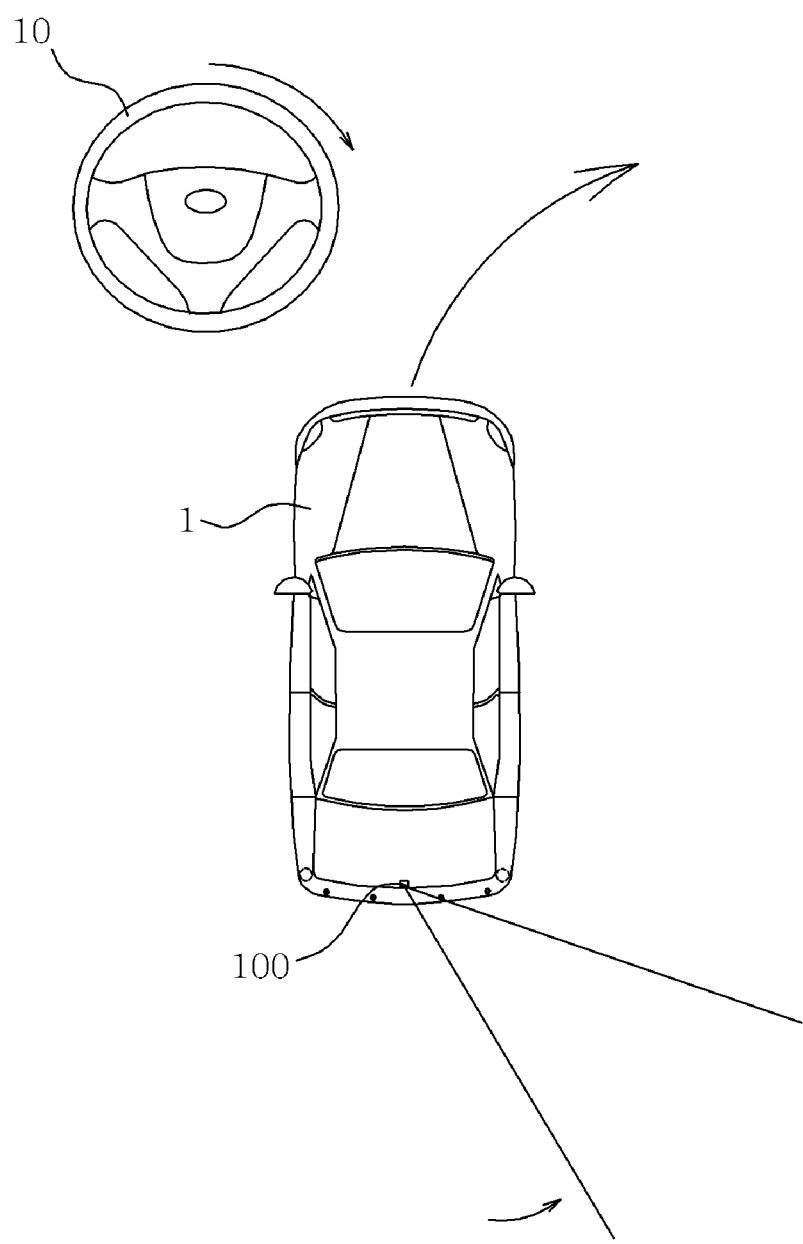

In this embodiment, the cluster microcomputer 340 of the cluster 300 receives the steering angle of the steering wheel 10 and the speed of the vehicle from the ECU 30, and controls a horizontal capture range of the rear capture unit 100 to be changed according to the steering angle of the steering wheel 10 and the speed of the vehicle. That is, as shown in FIGS. 27 and 28, as the steering angle of the steering wheel 10 increases, the cluster microcomputer 340 controls the rear view capture range of the rear capture unit 100 to shift further to one side. In addition, the cluster microcomputer 340 may match the range with the speed of the vehicle to differently set the range of steering angle of the steering wheel 10 according to the speed of the vehicle. Thereby, the horizontal capture range of the rear capture unit 100 may be controlled to be changed. This is intended to decrease the steering angle of the steering wheel 10 as the speed of the vehicle increases as in the case of lane change during high-speed driving and left or right turn during low-speed driving. For example, in the case where the speed of the vehicle is greater than or equal to 80 km/h, and the steering angle of the steering wheel is 45° and the case where the speed of the vehicle is less than or equal to 20 km/h and a steering angle of the steering wheel is 90°, the rear capture unit 100 may be programmed to capture the same horizontal area.

Figure 29:
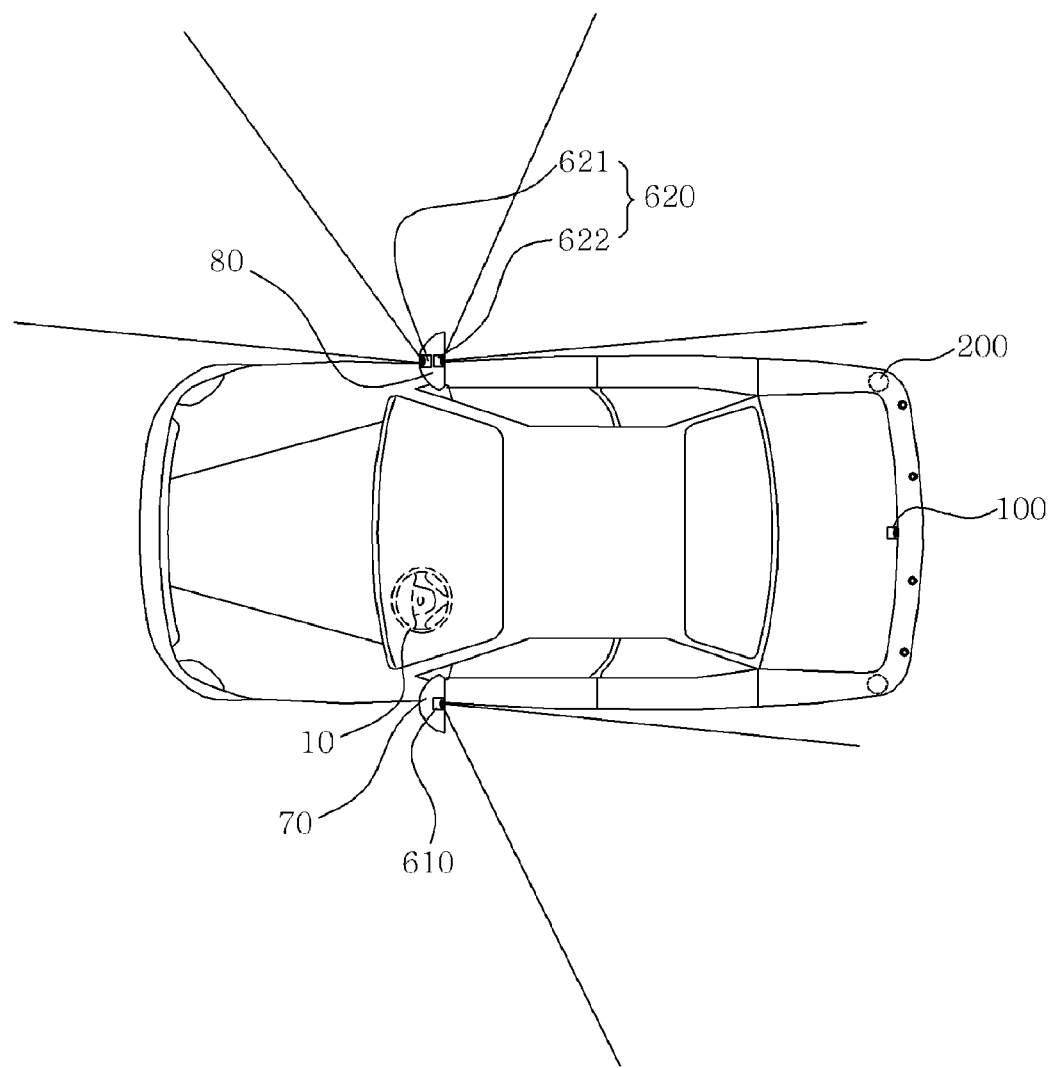
FIG. 29 is a plan view illustrating the exterior of the vehicle provided with a side capture unit in an HUD integrated cluster system for a vehicle camera according to a third embodiment of the present invention.
Figure 30:
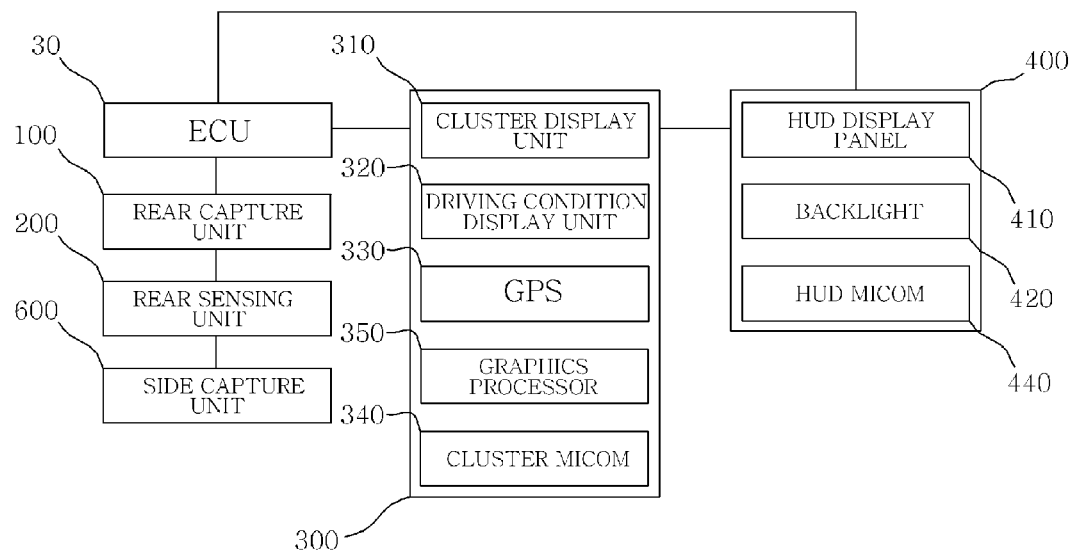
FIG. 30 is a system block diagram according to the embodiment of FIG. 29.

According to a third embodiment of the present invention, an HUD integrated cluster system for a vehicle camera includes a rear capture unit 100, a rear sensing unit 200, a cluster 300, an HUD 400 and a side capture unit 600, as shown in FIGS. 29 and 30. Redundant description of elements described in the first embodiment in detail will be omitted.

The side capture unit 600 includes a driver's seat side camera 610 installed at the side mirror 70 near the driver's seat and a front passenger seat side camera 620 installed at the side mirror 80 near the front passenger seat, which are configured to capture images of the left and right sides of the vehicle 1. The front passenger seat side camera 620 includes a front passenger seat front camera 621 and a front passenger seat rear camera 622 to capture images of the front view and rear view of the front passenger seat.

In this embodiment, the cluster microcomputer 340 of the cluster 300 receives the speed of the vehicle, gear shift, blinking of a turn signal, and the steering direction of the steering wheel from the ECU 30, and displays an image captured by the side capture unit 600 and an image captured by the rear capture unit 100 on the cluster display unit 310 together according to a turn direction of the vehicle and a direction of lane change. In particular, when the cluster microcomputer 340 receives, from the ECU 30, blinking of a right turn signal or the orientation of the steering wheel rotated to the front passenger seat in the drive gear mode, the cluster 300 displays images captured by the front passenger seat front camera 621 and front passenger seat rear camera 622 and an image captured by the rear capture unit 100 on the cluster display unit 310 together.

In addition, in this embodiment, the HUD 400 projects, onto the windshield 40, the captured images from the side capture unit 600 and the rear capture unit 100 which are displayed on the cluster display unit 310 by the graphics processor 350 of the cluster 300.

Figure 31:
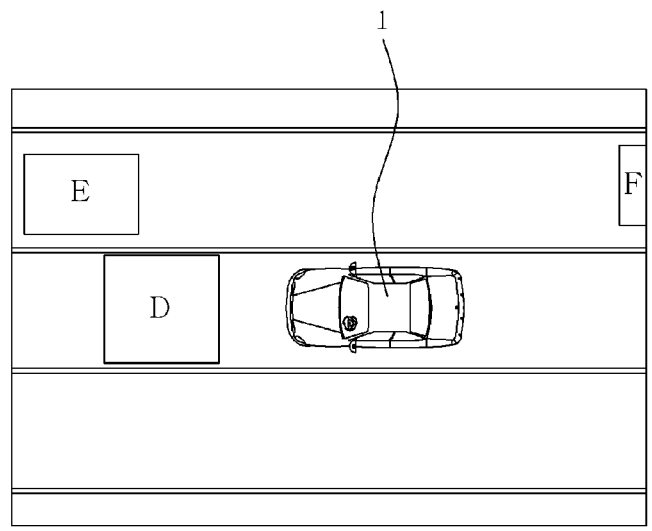
FIG. 31 shows an example of objects which are positioned in front of or behind the vehicle or approach the vehicle, illustrating displaying an image captured by the side capture unit on the cluster and the HUD according to the embodiment of FIG. 29.
Figure 32:
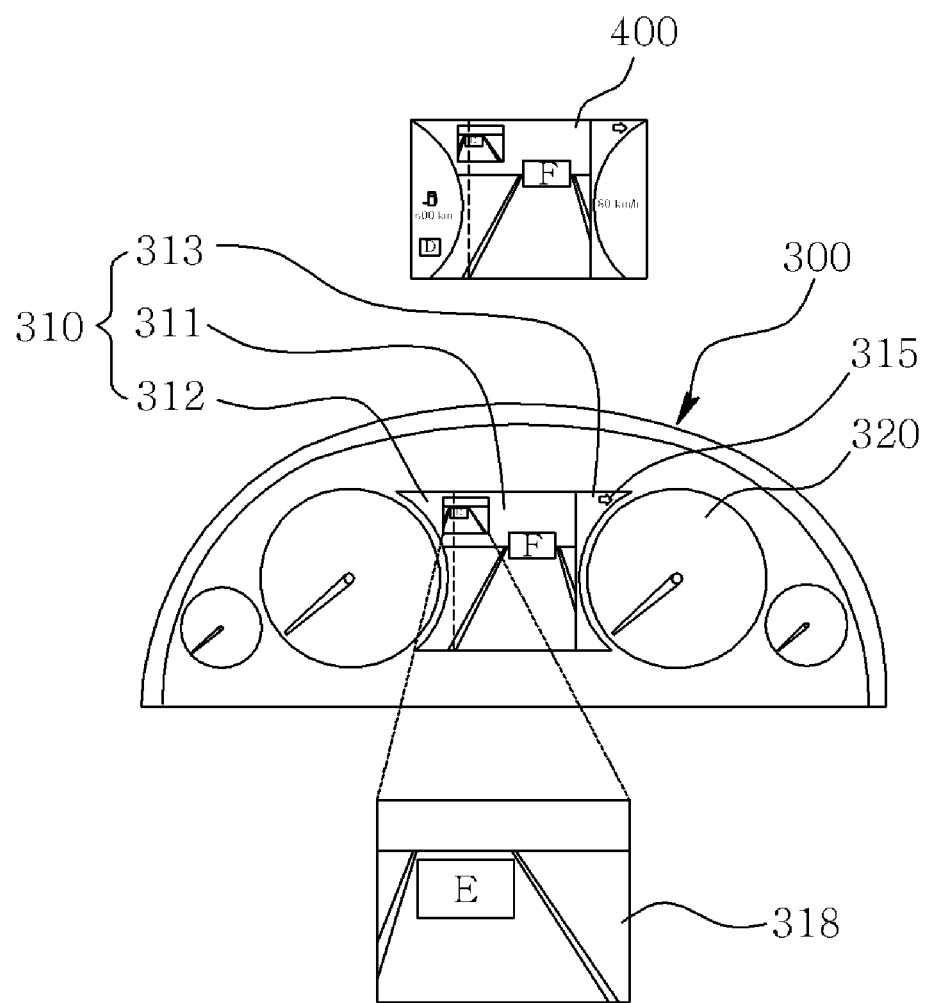
FIG. 32 illustrates displaying an image captured by the side capture unit on the cluster and HUD according to the embodiment of FIG. 31.

FIG. 31 shows an example of objects E, D and F which are positioned in front of or behind a vehicle or approach the vehicle, illustrating displaying an image captured by the side capture unit 600 on the cluster 300 and the HUD 400, and FIG. 32 illustrates displaying an image captured by the side capture unit 600 on the cluster 30 and the HUD 400 according to the embodiment of FIG. 31. For example, in the case where the front passenger seat is positioned on the right side in the vehicle, if the cluster microcomputer 340 receives blinking of a right turn signal or the position of the steering wheel rotated clockwise, images captured by the rear capture unit 100 and front passenger seat rear camera 622 are displayed in the center area 311 and left area 312 of the cluster display unit 310, and a right arrow is displayed in the right area 313 in a blinking manner. The image 318 from the front passenger seat front camera 621 may be displayed in a manner that the image 318 is distinguished from the images captured by the rear capture unit 100 and the front passenger seat rear camera 622.

Figure 33:
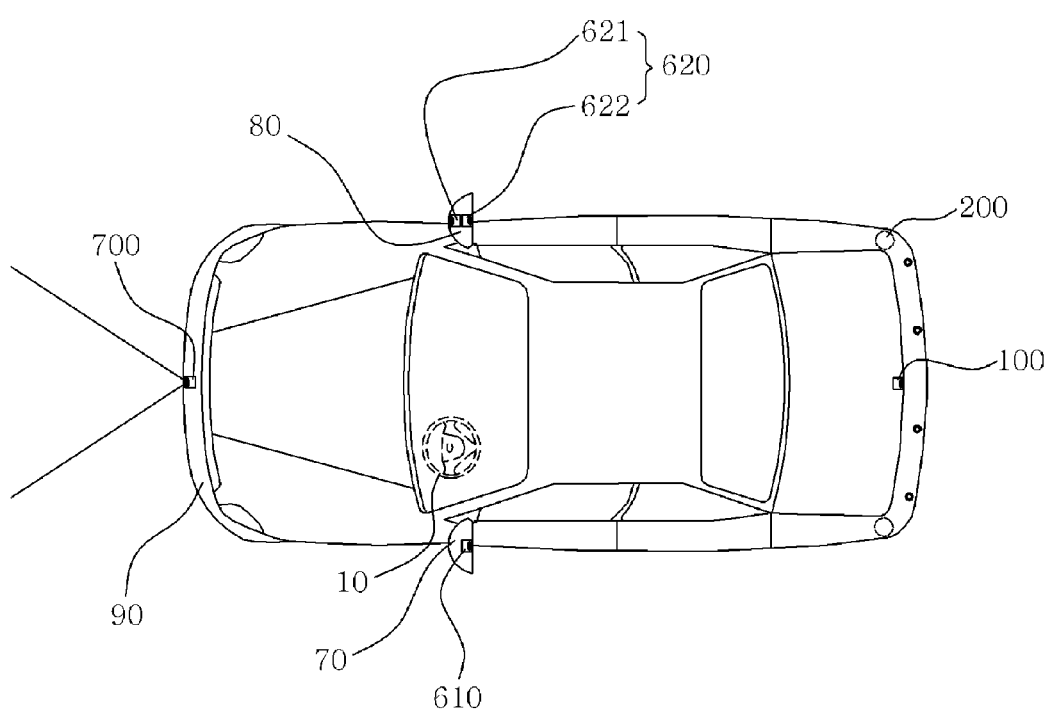
FIG. 33 is a plan view illustrating the exterior of a vehicle provided with a front capture unit in an HUD integrated cluster system for a vehicle camera according to a fourth embodiment of the present invention.
Figure 34:
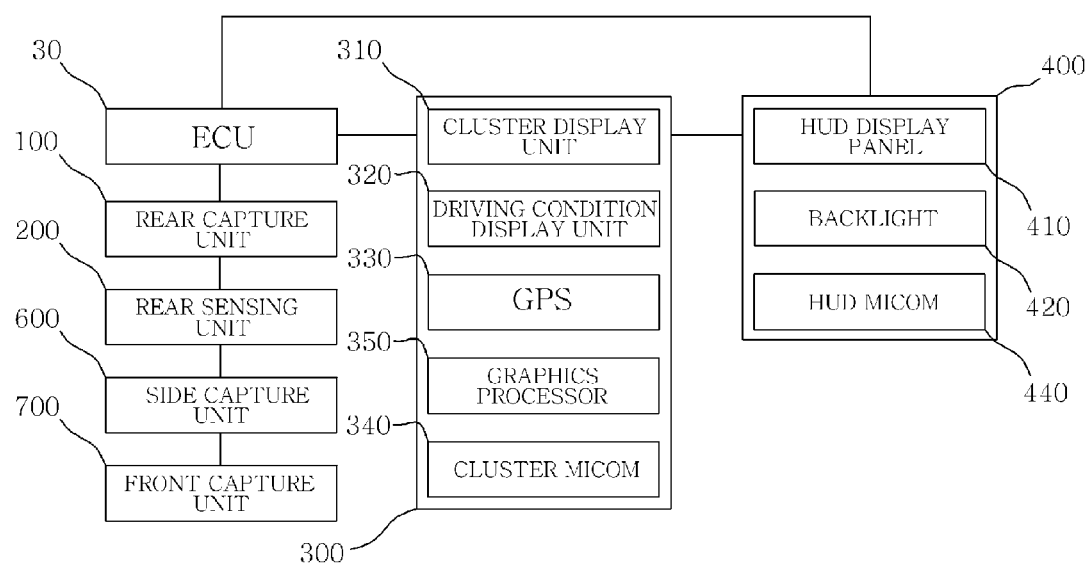
FIG. 34 is a system block diagram according to the embodiment of FIG. 33.

According to a fourth embodiment of the present measure, an HUD integrated cluster system for a vehicle camera includes a rear capture unit 100, a rear sensing unit 200, a cluster 300, an HUD 400, a side capture unit 600, and a front capture unit 700, as shown in FIGS. 33 and 34. Redundant description of elements described in the first to third embodiments in detail will be omitted.

The front capture unit 700 is installed at the front of the vehicle to capture an image of the front view of the vehicle 1. For example, the front capture unit 700 may be installed on the front bumper 90.

In this embodiment, the cluster microcomputer 340 of the cluster 300 receives the speed of the vehicle and the gearshift position from the ECU 30. If the speed of the vehicle is less than or equal to a certain speed in the drive gear mode, the cluster 300 displays the captured image from the front capture unit 700 on the cluster display unit 310. That is, the front capture unit 700 serves to complement a front view obstructed due to the height of the body of the vehicle and the hood of the vehicle in starting to move the vehicle or moving the vehicle forward or backward to park the vehicle.

In addition, the HUD 400 projects, onto the windshield 40, an image captured by the front capture unit 700 and displayed on the cluster display unit 310 by the graphics processor 350 of the cluster 300.

As is apparent from the above description, an HUD integrated cluster system for a vehicle camera according to an embodiment of the present invention displays captured images of the rear view of the vehicle on a cluster and an HUD in front of the driver's seat. Thereby, the gaze shift distance and gaze shift time may be reduced in watching the environment behind the vehicle and a traffic accident resulting from distraction from the front view may be prevented.

Second, the HUD integrated cluster system displays, on the cluster and the HUD in front of the driver's seat, an image of at least one of the rear center, rear left side and rear right side of the vehicle according to the speed of the vehicle, gear shift, blinking of a turn signal, and a steering direction of the steering wheel. Thereby, the driver may easily observe the rear view according to respective situations.

Third, the HUD integrated cluster system displays a captured rearview image of the vehicle and a warning light according to an object which is positioned near or approaches the vehicle. Thereby, the driver's attention may be readily drawn when the vehicle reverses or changes lanes.

Fourth, the HUD integrated cluster system displays, on a part in front of the driver's seat, rear view images corresponding to the driver's seat and the front passenger seat and a captured image of an object which is positioned in front of the front passenger seat and is not easily visible from the driver's seat due to a front object. Thereby, lane change to a right lane may be facilitated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A head-up display (HUD) integrated cluster system for a vehicle camera, comprising:
   a rear capture unit comprising a rear camera and a horizontal rotation motor, the rear camera being horizontally rotatably coupled to a back of a vehicle to capture an image of a rear center, rear left side or rear right side of the vehicle, and the horizontal rotation motor being installed on the back of the vehicle to horizontally rotate the rear camera and having a horizontal output shaft coupled with the rear camera;
   a plurality of rear sensing units installed on the back of the vehicle to sense objects positioned at the rear center and rear left and right sides of the vehicle or approaching the vehicle;
   a cluster installed in a dashboard installed in front of a steering wheel of the vehicle and electrically connected to an electronic control unit (ECU) for receiving information from various sensors installed in the vehicle to display current driving conditions of the vehicle, the cluster comprising a cluster display unit configured to display route information related to a location and route of the vehicle or at least one of images of the rear center, rear left side and rear right side of the vehicle captured by the rear capture unit while displaying a warning light according to sensed values of the rear sensing units in a blinking manner; and
   an HUD electrically connected to the cluster and the ECU to display the current driving conditions of the vehicle and enable the image and warning light displayed on the cluster display unit of the cluster to be projected onto a windshield in front of a driver's seat of the vehicle, the HUD being installed in the dashboard in front of the driver's seat.

2. The HUD integrated cluster system according to claim 1, wherein the rear sensing unit comprises at least one of an ultrasonic sensor and a radar sensor.

3. The HUD integrated cluster system according to claim 1, wherein the cluster comprises:
   a driving condition display unit configured to receive driving condition data of the vehicle from the ECU and display the current driving conditions of the vehicle including a speed of the vehicle and a fuel amount in an analog or digital manner,
   a global positioning system (GPS) configured to receive a GPS signal and calculate the route information related to the location and route of the vehicle,
   a cluster microcomputer configured to receive the sensed values of the rear sensing units and control the captured image from the rear capture unit and the warning light to be displayed together on the cluster display unit, the cluster microcomputer controlling the rear capture unit to selectively capture an image of the rear center, rear left side or rear right side of the vehicle by receiving, from the ECU, the speed of the vehicle, a gearshift position, blinking of a turn signal and a steering direction of the steering wheel and controlling the route information to be displayed on the cluster display unit by receiving a calculated signal from the GPS,
   a graphics processor configured to receive, from the cluster microcomputer, graphics data of the captured image, warning light or route information displayed on the cluster display unit and deliver the same to the HUD.

4. The HUD integrated cluster system according to claim 3, wherein the cluster display unit comprises:
   a center area positioned at a center of the cluster display unit;
   a left area connected to the center area and positioned on a left side of the center area; and
   a right area connected to the center area and positioned on a right side of the center area.

5. The HUD integrated cluster system according to claim 4, wherein the cluster microcomputer comprises:
   a route mode for controlling the route information to be displayed in the center area, left area and right area of the cluster display unit when none of shift to a reverse gear mode, blinking of the turn signal and counterclockwise or clockwise rotation of the steering wheel of the vehicle is performed,
   a reverse mode for controlling the captured image corresponding to a direction of reverse of the vehicle to be displayed in the center area, left area and right area of the cluster display unit when the vehicle reverses straight, reverses to the left or reverses to the right according to a direction of rotation of the steering wheel in the reverse gear mode of the vehicle;
   a left turn mode for controlling the captured image of the rear left side of the vehicle to be displayed in the center area and right area of the cluster display unit and a left arrow to be displayed in the left area of the cluster display unit in a blinking manner when any one of blinking of a left turn signal and counterclockwise rotation of the steering wheel occurs in a drive gear mode of the vehicle;
   a right turn mode for controlling the captured image of the rear right side of the vehicle to be displayed in the center area and left area of the cluster display unit and a right arrow to displayed in the right area of the cluster display unit in a blinking manner when any one of blinking of the turn signal to the right and clockwise rotation of the steering wheel occurs in the drive gear mode of the vehicle; and
   a warning mode for controlling the warning light to be displayed in the left area in a blinking manner when an object approaching the vehicle from the rear left side of the vehicle is sensed by the rear sensing unit in the reverse mode, left turn mode or right turn mode and controlling the warning light to be displayed in the right area in a blinking manner when an object approaching the vehicle from the rear right side of the vehicle is sensed.

6. The HUD integrated cluster system according to claim 5, wherein the rear capture unit further comprises:
   a vertical rotation motor having a vertical output shaft coupled with the horizontal rotation motor to enable the rear camera to capture the image of the rear center, rear left side or rear right side of the vehicle while vertically rotating,
   wherein, in the reverse mode, the rear camera of the rear capture unit is controlled to rotate upward when the speed of the vehicle received from the ECU exceeds a pre-stored speed, and is controlled to rotate downward when the speed of the vehicle is less than the pre-stored speed.

7. The HUD integrated cluster system according to claim 5, wherein the HUD comprises:
   an HUD display panel configured to receive graphics data of each of the route mode, reverse mode, left turn mode, right turn mode and warning mode of the cluster microcomputer from the graphics processor having received the graphics data and display the same, the HUD display panel being fixedly installed in the dashboard in front of the driver's seat;
   a backlight fixedly installed in the dashboard in front of the driver's seat and configured to provide light to the HUD display panel;
   an optical system fixedly installed in the dashboard in front of the driver's seat and configured to project an enlarged or reduced version of an image displayed on the HUD display panel onto the windshield in front of the driver's seat of the vehicle; and
   an HUD microcomputer configured to adjust illuminance of the backlight according to an external environment for day and night.

8. The HUD integrated cluster system according to claim 7, wherein the HUD further comprises:
   a combiner installed on the dashboard in front of the driver's seat of the vehicle so as to protrude from the dashboard or to be vertically retrievable,
   wherein the optical system is fixedly installed in the dashboard in front of the driver's seat, and projects an enlarged or reduced version of the image displayed on the HUD display panel onto the combiner.

9. The HUD integrated cluster system according to claim 3, wherein the cluster further comprises:
   a shock sensor configured to sense external shock exerted on the vehicle; and
   a memory unit having a memory card retrievably coupled thereto to store images captured by the rear capture unit according to a detection value of the shock sensor, the memory unit automatically formatting the memory card according to a remaining memory space of the memory card or automatically deleting the captured images in a temporal order.

10. The HUD integrated cluster system according to claim 3, further comprising:
    a steering angle sensor configured to detect a steering angle of the steering wheel and to transmit a value of the detected angle to the ECU,
    wherein the cluster microcomputer receives the steering angle of the steering wheel and the speed of the vehicle from the ECU, and controls a horizontal capture range of the rear capture unit to be changed according to the steering angle of the steering wheel and the speed of the vehicle.

11. The HUD integrated cluster system according to claim 3, further comprising:
    a side capture unit comprising a driver's seat side camera installed at a side mirror near the driver's seat and a front passenger seat side camera installed at a side mirror near the front passenger seat, the driver's seat side camera and the front passenger seat side camera being configured to capture images of left and right sides of the vehicle,
    wherein the cluster microcomputer of the cluster receives the speed of the vehicle, the gear shift position, blinking of the turn signal, and the steering direction of the steering wheel from the ECU, and displays an image captured by the side capture unit and an image captured by the rear capture unit on the cluster display unit together according to a turn direction of the vehicle and a direction of change of lanes, wherein the HUD projects, onto the windshield, the captured images from the side capture unit and the rear capture unit displayed on the cluster display unit by the graphics processor of the cluster.

12. The HUD integrated cluster system according to claim 11, wherein the front passenger seat side camera of the side capture unit comprises:
   a front passenger seat front camera and a front passenger seat rear camera configured to capture images of a front view and rear view of the front passenger seat,
   wherein, when the cluster microcomputer receives, from the ECU, blinking of the turn signal toward the front passenger seat or an orientation of the steering wheel rotated to the front passenger seat in a drive gear mode, the cluster displays images captured by the front passenger seat front camera and front passenger seat rear camera and an image captured by the rear capture unit on the cluster display unit together.

13. The HUD integrated cluster system according to claim 11, further comprising:
   a front capture unit installed at a front of the vehicle to capture an image of a front view of the vehicle,
   wherein the cluster microcomputer of the cluster receives the speed of the vehicle and the gearshift position from the ECU, and when the speed of the vehicle is less than or equal to a certain speed in a drive gear mode, the cluster displays the captured image from the front capture unit on the cluster display unit,
   wherein the HUD projects, onto the windshield, the captured image of the front capture unit displayed on the cluster display unit by the graphics processor of the cluster.

* * * * *